United States Patent
Whitehead et al.

(10) Patent No.: US 7,403,332 B2
(45) Date of Patent: Jul. 22, 2008

(54) HIGH DYNAMIC RANGE DISPLAY DEVICES

(75) Inventors: Lorne A. Whitehead, Vancouver (CA); Helge Seetzen, Montreal (CA); Don Graham, Vancouver (CA); Greg Ward, Albany, CA (US); Wolfgang Stuerzlinger, Toronto (CA)

(73) Assignee: Dolby Laboratories Licensing Corporation, San Francisco, CA (US)

( * ) Notice: Subject to any disclaimer, the term of this patent is extended or adjusted under 35 U.S.C. 154(b) by 309 days.

(21) Appl. No.: 10/507,460

(22) PCT Filed: Mar. 13, 2003

(86) PCT No.: PCT/CA03/00350

§ 371 (c)(1),
(2), (4) Date: Sep. 10, 2004

(87) PCT Pub. No.: WO03/077013

PCT Pub. Date: Sep. 18, 2003

(65) Prior Publication Data

US 2005/0162737 A1    Jul. 28, 2005

Related U.S. Application Data

(60) Provisional application No. 60/363,563, filed on Mar. 13, 2002.

(51) Int. Cl.
G03B 21/56    (2006.01)
G02F 1/1335    (2006.01)

(52) U.S. Cl. .................................. 359/443; 349/61

(58) Field of Classification Search .............. 359/443, 359/449; 349/51, 61; 345/51
See application file for complete search history.

(56) References Cited

U.S. PATENT DOCUMENTS

| | | |
|---|---|---|
| 4,170,771 A | 10/1979 | Bly |
| 4,364,039 A | 12/1982 | Penz |
| 4,441,791 A | 4/1984 | Hornbeck |
| 4,559,480 A | 12/1985 | Nobs |
| 4,637,150 A | 1/1987 | Geluk |
| 4,933,754 A | 6/1990 | Reed et al. |
| 4,954,789 A | 9/1990 | Sampsell |
| 4,995,719 A | 2/1991 | Shanks |

(Continued)

FOREIGN PATENT DOCUMENTS

EP    0730371 A2    9/1996

(Continued)

OTHER PUBLICATIONS

Funamoto, "High-Picture-Quality Technique for LCD Television: LCD-A1", *Proc. SID* International Display Workshop (IDW '00), Nov. 2000, pp. 1157-1158.

(Continued)

*Primary Examiner*—Christopher Mahoney

(57) ABSTRACT

A display has a screen which incorporates a light modulator. The screen may be a front projection screen or a rear-projection screen. The screen is illuminated with light from a light source comprising an array of controllable light-emitters. The controllable-emitters and elements of the light modulator may be controlled to adjust the intensity of light emanating from corresponding areas on the screen. The display may provide a high dynamic range.

58 Claims, 15 Drawing Sheets

U.S. PATENT DOCUMENTS

| | | |
|---|---|---|
| 5,075,789 A | 12/1991 | Jones et al. |
| 5,103,328 A | 4/1992 | Numao |
| 5,122,791 A | 6/1992 | Gibbons et al. |
| 5,144,292 A | 9/1992 | Shiraishi et al. |
| 5,247,366 A | 9/1993 | Ginosar et al. |
| 5,359,345 A * | 10/1994 | Hunter ........................ 345/102 |
| 5,386,253 A | 1/1995 | Fielding |
| 5,537,256 A | 7/1996 | Fergason |
| 5,572,341 A | 11/1996 | Fergason |
| 5,592,193 A | 1/1997 | Chen |
| 5,639,158 A | 6/1997 | Sato |
| 5,646,702 A | 7/1997 | Akinwande et al. |
| 5,652,672 A | 7/1997 | Huignard et al. |
| 5,666,226 A | 9/1997 | Ezra et al. |
| 5,684,354 A | 11/1997 | Gleckman |
| 5,715,029 A | 2/1998 | Fergason |
| 5,717,422 A | 2/1998 | Fergason |
| 5,724,062 A | 3/1998 | Hunter |
| 5,729,242 A | 3/1998 | Margerum et al. |
| 5,748,828 A | 5/1998 | Steiner et al. |
| 5,784,181 A | 7/1998 | Loiseaux et al. |
| 5,809,215 A | 9/1998 | Heydinger et al. |
| 5,889,567 A | 3/1999 | Swanson et al. |
| 5,892,325 A | 4/1999 | Gleckman |
| 5,933,754 A | 8/1999 | Mathews et al. |
| 5,954,789 A | 9/1999 | Yu et al. |
| 5,959,777 A | 9/1999 | Whitehead |
| 5,978,142 A | 11/1999 | Blackham et al. |
| 5,986,628 A | 11/1999 | Tuenge et al. |
| 6,043,591 A | 3/2000 | Gleckman |
| 6,111,559 A | 8/2000 | Motomura et al. |
| 6,111,560 A | 8/2000 | May |
| 6,120,588 A | 9/2000 | Jacobson |
| 6,120,839 A | 9/2000 | Comiskey et al. |
| 6,172,798 B1 | 1/2001 | Albert et al. |
| 6,184,969 B1 | 2/2001 | Fergason |
| 6,215,920 B1 | 4/2001 | Whitehead et al. |
| 6,243,055 B1 | 6/2001 | Fergason |
| 6,243,068 B1 | 6/2001 | Evanicky et al. |
| 6,268,843 B1 | 7/2001 | Arakawa |
| 6,276,801 B1 | 8/2001 | Fielding |
| 6,300,932 B1 | 10/2001 | Albert |
| 6,323,989 B1 | 11/2001 | Jacobson et al. |
| 6,327,072 B1 | 12/2001 | Comiskey et al. |
| 6,381,372 B1 | 4/2002 | Loce |
| 6,428,189 B1 | 8/2002 | Hochstein |
| 6,437,769 B1 | 8/2002 | Kobayashi et al. |
| 6,439,731 B1 | 8/2002 | Johnson et al. |
| 6,448,951 B1 | 9/2002 | Sakaguchi et al. |
| 6,448,955 B1 | 9/2002 | Evanicky et al. |
| 6,483,643 B1 | 11/2002 | Zuchowski |
| 6,520,646 B2 | 2/2003 | Rodriguez, Jr. et al. |
| 6,590,561 B1 | 7/2003 | Kabel et al. |
| 6,621,482 B2 | 9/2003 | Fuller |
| 6,631,995 B2 | 10/2003 | Stanton et al. |
| 6,657,607 B1 | 12/2003 | Evanicky et al. |
| 6,680,834 B2 | 1/2004 | Williams |
| 6,683,657 B1 | 1/2004 | Miyawaki |
| 6,753,661 B2 | 6/2004 | Muthu et al. |
| 6,796,658 B2 | 9/2004 | Hubel et al. |
| 6,803,901 B1 | 10/2004 | Numao |
| 6,816,141 B1 | 11/2004 | Fergason |
| 6,817,717 B2 | 11/2004 | Childers et al. |
| 6,863,401 B2 | 3/2005 | Penn |
| 6,888,663 B2 | 5/2005 | Bourdelais et al. |
| 6,891,672 B2 | 5/2005 | Whitehead et al. |
| 6,952,195 B2 | 10/2005 | Arakawa |
| 6,980,195 B2 | 12/2005 | Lonoce et al. |
| 6,985,272 B2 | 1/2006 | Bridgwater et al. |
| 7,002,533 B2 | 2/2006 | Sayag |
| 7,018,046 B2 | 3/2006 | Childers et al. |
| 7,052,152 B2 | 5/2006 | Harbers et al. |
| 7,053,881 B2 | 5/2006 | Itoh |
| 7,064,740 B2 | 6/2006 | Daly |
| 7,071,907 B1 | 7/2006 | Duboc, Jr. et al. |
| 7,106,505 B2 | 9/2006 | Whitehead et al. |
| 7,118,225 B2 | 10/2006 | Penn |
| 7,172,297 B2 | 2/2007 | Whitehead et al. |
| 7,175,281 B1 | 2/2007 | Berman |
| 2001/0035853 A1 | 11/2001 | Hoelen et al. |
| 2002/0135553 A1 | 9/2002 | Nagai et al. |
| 2002/0159002 A1 | 10/2002 | Chang |
| 2002/0171617 A1 | 11/2002 | Fuller |
| 2003/0048393 A1 | 3/2003 | Sayag |
| 2003/0090455 A1 | 5/2003 | Daly |
| 2004/0057017 A1 | 3/2004 | Childers et al. |
| 2005/0083295 A1 | 4/2005 | Daly |
| 2005/0083296 A1 | 4/2005 | Daly |
| 2006/0125745 A1 | 6/2006 | Evanicky |
| 2007/0035706 A1 | 2/2007 | Margulis |
| 2007/0126992 A1 | 6/2007 | Penn |

FOREIGN PATENT DOCUMENTS

| | | |
|---|---|---|
| EP | 0 829 747 A1 | 3/1998 |
| EP | 1136874 A1 | 9/2001 |
| EP | 1 202 244 A1 | 5/2002 |
| EP | 1431653 A2 | 6/2004 |
| EP | 1521235 A2 | 4/2005 |
| JP | 02-162389 | 6/1990 |
| JP | HEI 3-1111 | 3/1991 |
| JP | 3198026 | 8/1991 |
| JP | 08/334742 A | 12/1996 |
| JP | 11052412 A | 2/1999 |
| JP | 2000-035576 | 2/2000 |
| JP | 2000-275995 A | 10/2000 |
| JP | 2001-100689 | 4/2001 |
| JP | 2002-091385 | 3/2002 |
| JP | 2002-91385 A | 3/2002 |
| JP | 2002-099250 | 4/2002 |
| WO | WO91/15843 | 10/1991 |
| WO | WO96/33483 | 10/1996 |
| WO | WO 00/40018 | 7/2000 |
| WO | WO 00/75720 A2 | 12/2000 |
| WO | WO 01/69584 A1 | 9/2001 |
| WO | WO 01/69941 | 9/2001 |
| WO | WO 02/03687 A2 | 1/2002 |
| WO | WO 02/069030 A3 | 9/2002 |
| WO | WO 02/079862 A2 | 10/2002 |
| WO | WO 03/077013 | 9/2003 |

OTHER PUBLICATIONS

U.S. Appl. No. 11/506,462, filed Aug. 8, 2006 (Whitehead et al.).
U.S. Appl. No. 11/608,771, filed Dec. 8, 2006 (Whitehead et al.).
U.S. Appl. No. 11/702,839, filed Feb. 5, 2007 (Whitehead et al.).
U.S. Appl. No. 11/831,720, filed Jul. 31, 2007 (Whitehead et al.).
U.S. Appl. No. 11/831,737, filed Jul. 31, 2007 (Whitehead et al.).
U.S. Appl. No. 11/831,749, filed Jul. 31, 2007 (Whitehead et al.).
U.S. Appl. No. 11/831,827, filed Jul. 31, 2007 (Whitehead et al.).
U.S. Appl. No. 11/831,851, filed Jul. 31, 2007 (Whitehead et al.).
U.S. Appl. No. 11/831,864, filed Jul. 31, 2007 (Whitehead et al.).

* cited by examiner

FIGURE 8C  FIGURE 8E

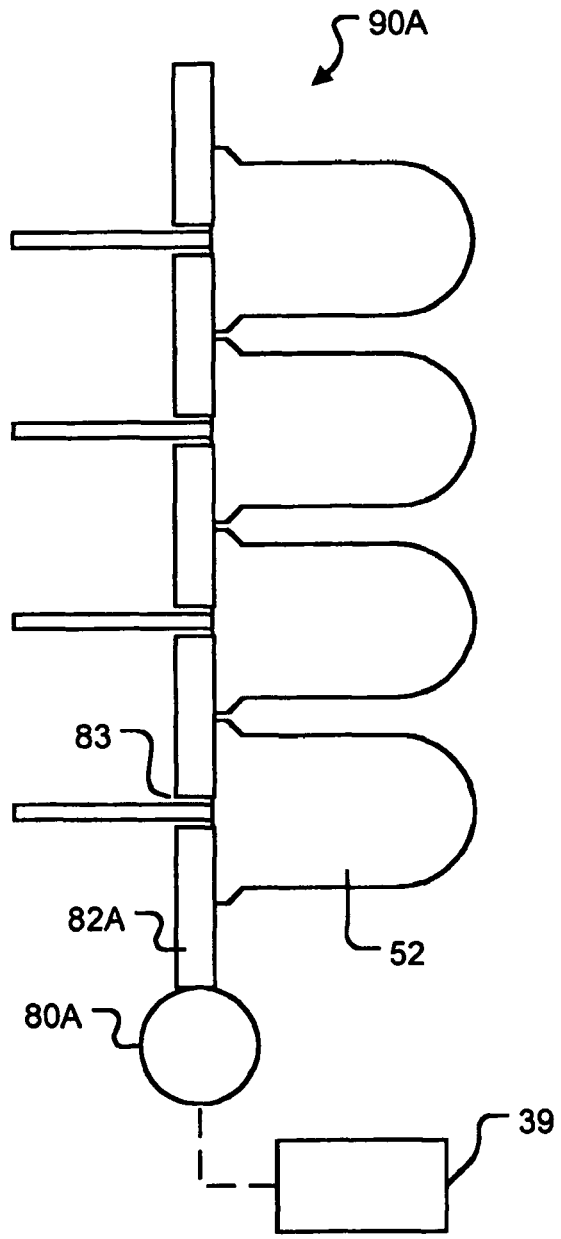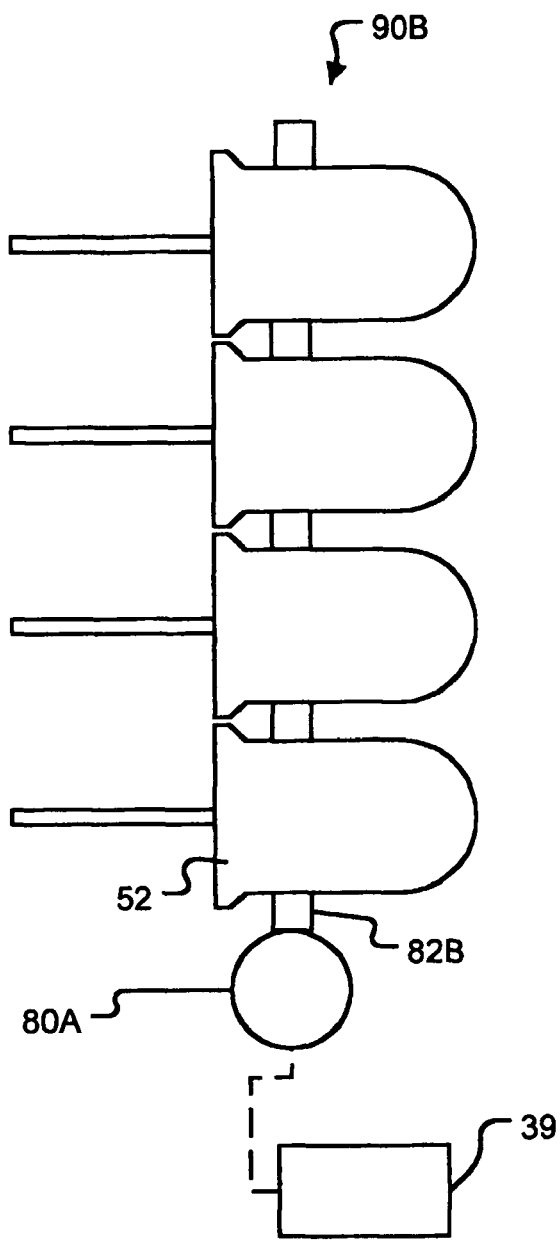
FIGURE 11C    FIGURE 11D

HIGH DYNAMIC RANGE DISPLAY DEVICES

CROSS REFERENCE TO RELATED APPLICATION

This application claims the benefit of the filing date of U.S. application Ser. No. 60/363,563 filed 13 Mar. 2002 and entitled HIGH DYNAMIC RANGE DISPLAY DEVICES.

TECHNICAL FIELD

The invention relates to displays for displaying digital images.

BACKGROUND

Dynamic range is the ratio of intensity of the highest luminance parts of a scene and the lowest luminance parts of a scene. For example, the image projected by a video projection system may have a maximum dynamic range of 300:1.

The human visual system is capable of recognizing features in scenes which have very high dynamic ranges. For example, a person can look into the shadows of an unlit garage on a brightly sunlit day and see details of objects in the shadows even though the luminance in adjacent sunlit areas may be thousands of times greater than the luminance in the shadow parts of the scene. To create a realistic rendering of such a scene can require a display having a dynamic range in excess of 1000:1. The term "high dynamic range" means dynamic ranges of 800:1 or more.

Modern digital imaging systems are capable of capturing and recording digital representations of scenes in which the dynamic range of the scene is preserved. Computer imaging systems are capable of synthesizing images having high dynamic ranges. However, current display technology is not capable of rendering images in a manner which faithfully reproduces high dynamic ranges.

Blackham et al., U.S. Pat. No. 5,978,142 discloses a system for projecting an image onto a screen. The system has first and second light modulators which both modulate light from a light source. Each of the light modulators modulates light from the source at the pixel level. Light modulated by both of the light modulators is projected onto the screen.

Gibbon et al., PCT application No. PCT/US01/21367 discloses a projection system which includes a pre modulator. The pre modulator controls the amount of light incident on a deformable mirror display device. A separate pre-modulator may be used to darken a selected area (e.g. a quadrant).

There exists a need for cost effective displays capable of reproducing a wide range of light intensities in displayed images.

SUMMARY OF THE INVENTION

This invention provides displays for displaying images. One embodiment of the invention provides a display comprising: a light source comprising an array of light-emitting elements. Each of the elements has a controllable light output; and, a spatial light modulator comprising a plurality of controllable elements located to modulate light from the light source. A diffuser directs light from the light source which has been modulated by the spatial light modulator to a viewing area.

Another aspect of the invention provides a display comprising: a spatial light modulator comprising an array of controllable elements, each of the controllable elements providing a controllable light transmission; a light source comprising an array of solid state light-emitting elements each located to illuminate a plurality of corresponding controllable elements of the spatial light modulator and each having a controllable light output; and, a diffuser. Brightness of a point on the diffuser may be controlled by controlling the light output of one of the light-emitting elements corresponding to the point and controlling the light transmission of one of the controllable elements corresponding to the point.

A further aspect of the invention provides a display comprising: light provision means for providing light spatially modulated at a first spatial resolution; spatial modulation means for further spatially modulating the light at a second resolution different from the first resolution; and, means for controlling the first and second spatial modulation means to display an image defined by image data.

The invention also provides a method for displaying an image. The method comprises controlling an array of individually-controllable light-emitting elements to have brightnesses determined by a first set of image data; illuminating a face of a spatial light modulator with light from the array of light-emitting elements, the spatial light modulator comprising an array of elements, each of the elements having a controllable transmissivity; and, controlling the transmissivity of the elements of the spatial light modulator with a second set of image data.

Further aspects of the invention and features of specific embodiments of the invention are described below.

BRIEF DESCRIPTION OF THE DRAWINGS

In drawings which illustrate non-limiting embodiments of the invention,

FIG. 8C is a schematic view of a display having a grid interposed between an array of light sources and a spatial light modulator;

FIG. 8E is a schematic representation of one channel through a grid illustrating reflected and non-reflected light components impinging on a spatial light modulator;

DESCRIPTION

Throughout the following description, specific details are set forth in order to provide a more thorough understanding of the invention. However, the invention may be practiced without these particulars. In other instances, well known elements have not been shown or described in detail to avoid unnecessarily obscuring the invention. Accordingly, the specification and drawings are to be regarded in an illustrative, rather than a restrictive, sense.

This invention provides displays capable of rendering images with high dynamic ranges. Displays according to the invention comprise two light modulating stages. Light passes through the stages in series to provide an image which has an increased dynamic range.

Figure 1:
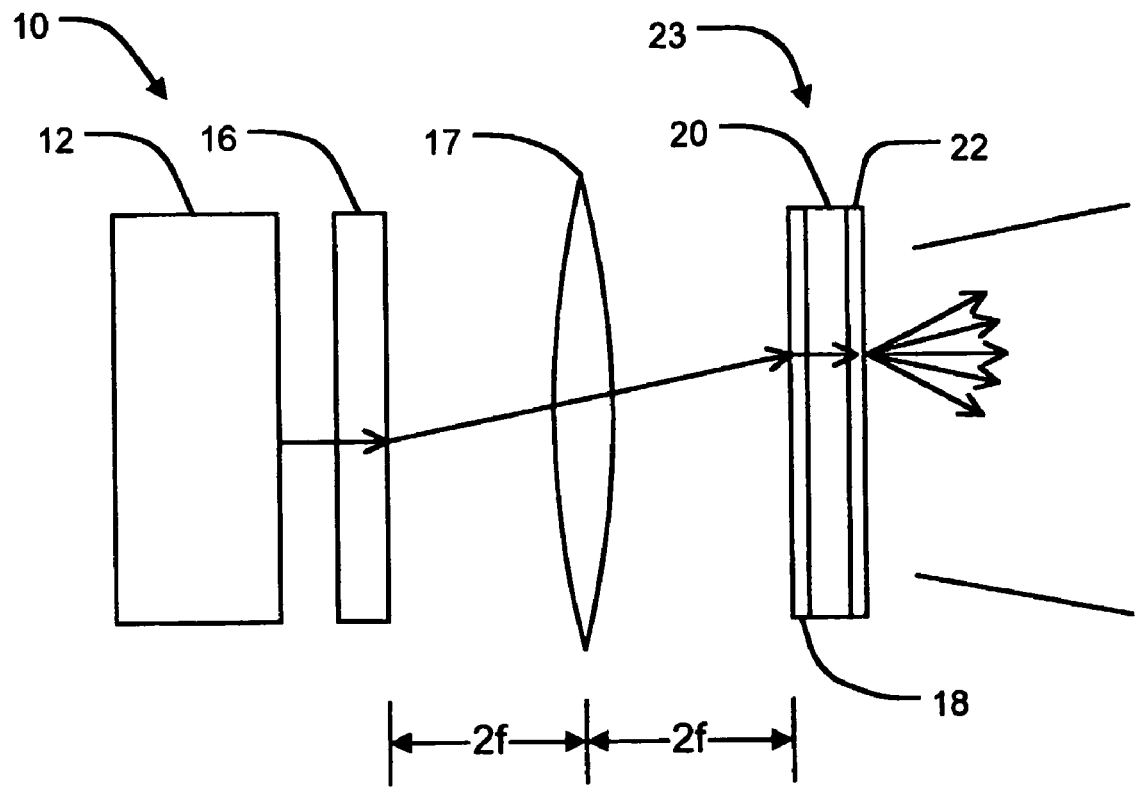
FIG. 1 is a schematic illustration of a display according to one embodiment of the invention.

FIG. 1 illustrates schematically a display 10 according to a simple embodiment of the invention. The sizes of elements and distances between them in FIG. 1 are not to scale. Display 10 comprises a light source 12. Light source 12 may, for example, comprise a projection lamp such as an incandescent lamp or an arc lamp, a laser, or another suitable source of light. Light source 12 may comprise an optical system comprising one or more mirrors, lenses or other optical elements which cooperate to deliver light to the rest of display 10.

In the illustrated embodiment, light from light source 12 is directed toward a first light modulator 16. Light source 12 preferably provides substantially uniform illumination of first light modulator 16. Light modulator 16 comprises an array of individually addressable elements. Light modulator 16 may comprise, for example, a LCD (liquid crystal display), which is an example of a transmission-type light modulator or a DMD (deformable mirror device), which is an example of a reflection-type light modulator. Display driver circuitry (not shown in FIG. 1) controls the elements of light modulator 16 according to data which defines an image being displayed.

Light which has been modulated by first light modulator 16 is imaged onto a rear-projection screen 23 by a suitable optical system 17. Light from a small area of first light modulator 16 is directed by optical system 17 to a corresponding area on rear-projection screen 23. In the illustrated embodiment, optical system 17 comprises a lens having a focal length f. In general, the optical system 17 which images light modulated by first light modulator 16 onto rear-projection screen 23 may comprise one or more mirrors, lenses or other optical elements. Such an optical system has the function of imaging light modulated by the first light modulator onto a second light modulator. Optical system 17 may be termed an imaging means.

In the illustrated embodiment, rear-projection screen 23 comprises a second light modulator 20 and a collimator 18. A main function of collimator 18 is to cause light which passes through rear-projection screen 23 to be directed preferentially toward a viewing area. Collimator 18 may comprise a Fresnel lens, a holographic lens, or, in the alternative, another arrangement of one or more lenses and/or other optical elements which operate to guide light in the direction of a viewing area.

In the illustrated embodiment, collimator 18 causes light to travel through the elements of second light modulator 20 in a direction which is generally normal to screen 23. As light incident from collimator 18 travels through second light modulator 20 it is further modulated. The light then passes to a diffuser 22 which scatters the outgoing light through a range of directions so that a viewer located on an opposite side of diffuser 22 from first light modulator 16 can see light originating from the whole area of screen 23. In general, diffuser 22 may scatter light to a different angular extent in the horizontal and vertical planes. Diffuser 22 should be selected so that light modulated by second light modulator 20 is scattered through a range of angles such that the maximum scatter angle is at least equal to the angle subtended by screen 23 when viewed from a desired viewing location.

Rear-projection screen 23 may differ in area from first light modulator 16. For example, rear-projection screen 23 may be larger in area than first light modulator 16. Where this is the case, optical system 17 expands the beam of light modulated by first light modulator 16 to illuminate a corresponding area on rear-projection screen 23 which is larger than first light modulator 16.

Second light modulator 20 may be of the same type as first light modulator 16 or a different type. Where first and second light modulators 16 and 20 are both of types that polarize light, second light modulator 20 should, as much as is practical, be oriented so that its plane of polarization matches that of the light incident on it from first light modulator 16.

Display 10 may be a color display. This may be achieved in various ways including:

making one of first light modulator 16 and second light modulator 20 a color light modulator;
 providing a plurality of different first light modulators 16 operating in parallel on different colors; and,
 providing a mechanism for rapidly introducing different color filters into the light path ahead of second light modulator 20.

As an example of the first approach above, second light modulator 20 may comprise an LCD panel having a plurality of pixels each comprising a number of colored sub-pixels. For example, each pixel may comprise three sub-pixels, one associated with a red filter, one associated with a green filter and one associated with a blue filter. The filters may be integral with the LCD panel.

Figure 1A:
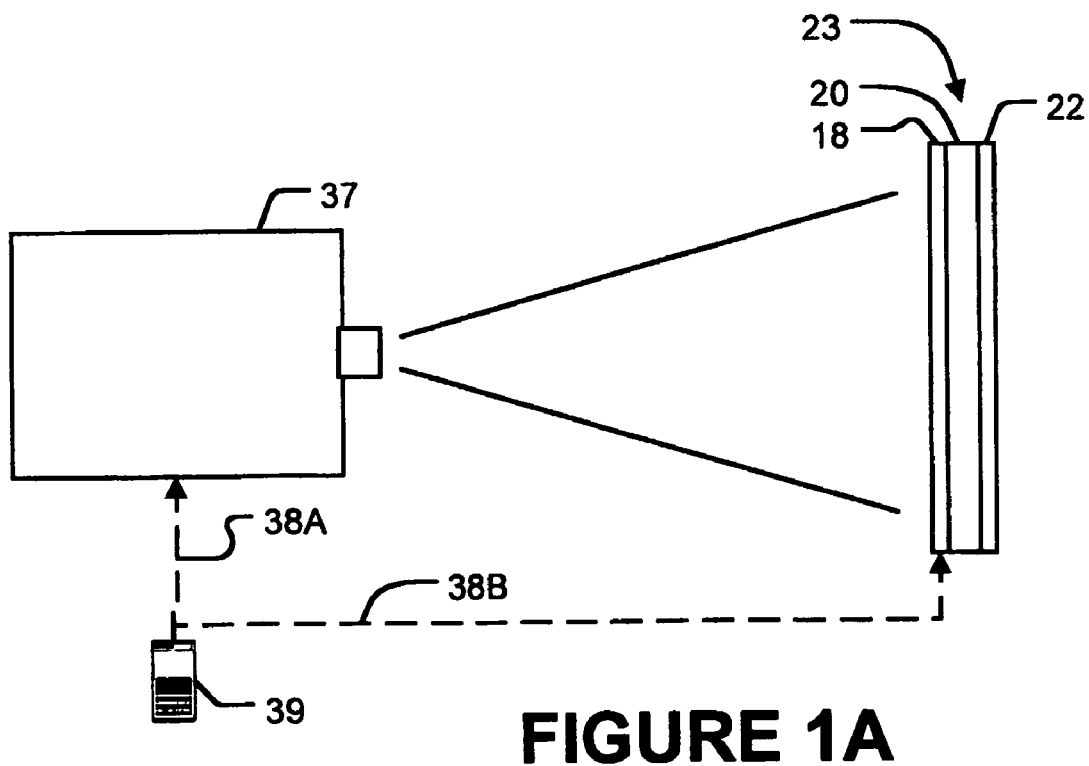
FIG. 1A is a schematic illustration of a specific implementation of the display of FIG. 1.

As shown in FIG. 1A, Light source 12, first light modulator 16 and optical system 17 may all be parts of a digital video projector 37 located to project an image defined by a signal 38A from a controller 39 onto the back side of rear-projection screen 23. The elements of second light modulator 20 are controlled by a signal 38B from controller 39 to provide an image to a viewer which has a high dynamic range.

Controller 39 may comprise any suitable data processor. Controller 39 may comprise one or more microprocessors running suitable control software together with interfaces which permit controller 39 to control the operation of a display according to the invention. The general construction of such controllers and general techniques for programming such controllers to provide desired functions are well known to those skilled in the art and will not be described in detail herein.

Figure 2:
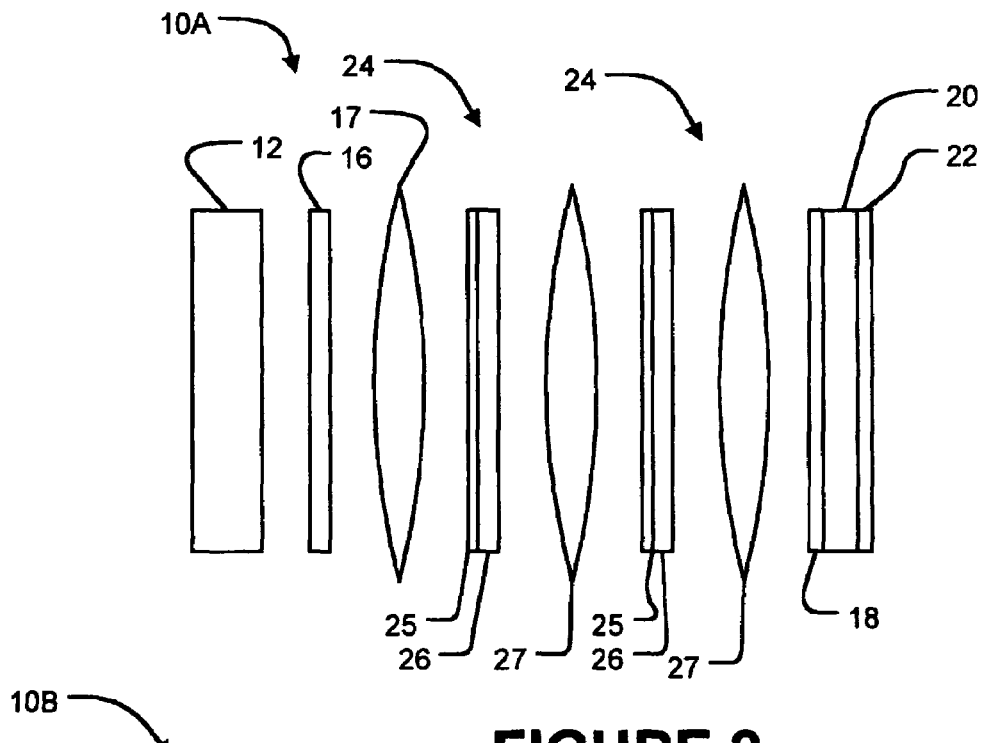
FIG. 2 is a schematic illustration of a display according to an alternative embodiment of the invention comprising four spatial light modulators.

As shown in FIG. 2, a display 10A according to the invention may comprise one or more additional light modulation stages 24. Each additional light modulation stage 24 comprises a collimator 25, a light modulator 26 and an optical system 27 which focuses light from light modulator 26 onto either the next additional light modulation stage 24 or on collimator 18. In device 10A of FIG. 2 there are two additional light modulation stages 24. Devices according to this embodiment of the invention may have one or more additional light modulation stages 24.

The luminance of any point on output diffuser 22 can be adjusted by controlling the amount of light passed on by corresponding elements of light modulators 16, 20 and 26. This control may be provided by a suitable control system (not shown in FIG. 2) connected to drive each of light modulators 16, 20 and 26.

Figure 3:
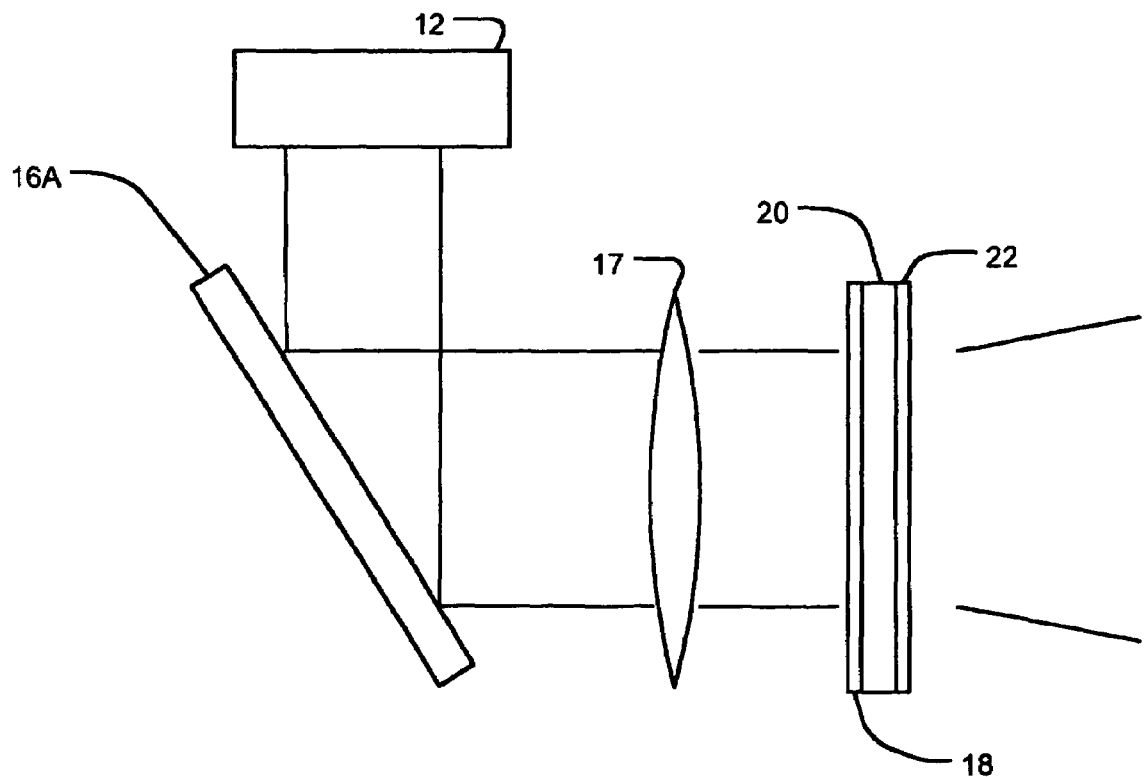
FIG. 3 is a schematic illustration of a rear-projection-type display according to a further embodiment of the invention.

As noted above, light modulators 16, 20 and 26 may all be of the same type or may be of two or more different types. FIG. 3 illustrates a display 10B according to an alternative embodiment of the invention which includes a first light modulator 16A which comprises a deformable mirror device. A deformable mirror device is a "binary" device in the sense that each pixel may be either "on" or "off". Different apparent brightness levels may be produced by turning a pixel on and off rapidly. Such devices are described, for example, in U.S. Pat. Nos. 4,441,791 and, 4,954,789 and are commonly used in digital video projectors. Light source 12 and first light modulator 16 (or 16A) may be the light source and modulator from a commercial digital video projector, for example.

Figure 4:
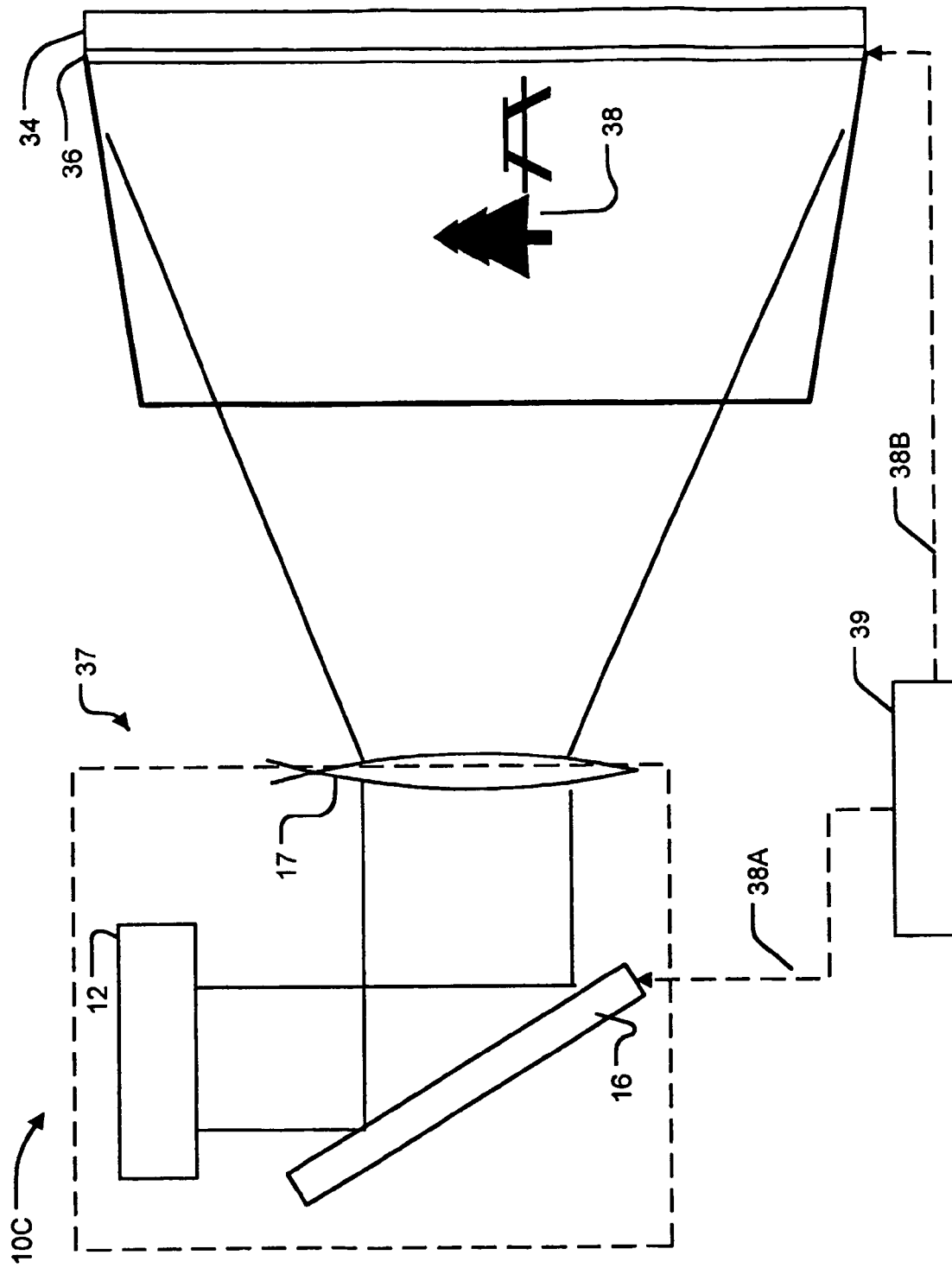
FIG. 4 is a schematic illustration of a front-projection-type display according to a still further embodiment of the invention.

FIG. 4 illustrates a front-projection-type display 10C according to the invention. Display 10C comprises a screen 34. A projector 37 projects an image 38 onto screen 34. Projector 37 comprises a suitable light source 12, a first light modulator 16 and an optical system 17 suitable for projecting an image defined by first light modulator 16 onto screen 34. Projector 37 may comprise a commercially available display projector. Screen 34 incorporates a second light modulator 36. Second light modulator 36 comprises a number of addressable elements which can be individually controlled to affect the luminance of a corresponding area of screen 34.

Light modulator 36 may have any of various constructions. For example, light modulator 36 may comprise an array of LCD elements each having a controllable transmissivity located in front of a reflective backing. Light projected by projector 37 passes through each LCD element and is reflected back through the LCD element by the reflective backing. The luminance at any point on screen 34 is determined by the intensity of light received at that point by projector 37 and the degree to which light modulator 36 (e.g. the LCD element at that point) absorbs light being transmitted through it.

Light modulator 36 could also comprise an array of elements having variable retro-reflection properties. The elements may be prismatic. Such elements are described, for example, in Whitehead, U.S. Pat. No. 5,959,777 entitled Passive High Efficiency Variable Reflectivity Image Display Device and, Whitehead et al., U.S. Pat. No. 6,215,920 entitled Electrophoretic, High Index and Phase Transition Control of Total Internal Reflection in High Efficiency Variable Reflectivity Image Displays.

Light modulator 36 could also comprise an array of electrophoretic display elements as described, for example, in Albert et al., U.S. Pat. No. 6,172,798 entitled Shutter Mode Microencapsulated Electrophoretic Display; Comiskey et al., U.S. Pat. No. 6,120,839 entitled Electro-osmotic Displays and Materials for Making the Same; Jacobson, U.S. Pat. No. 6,120,588 entitled: Electronically Addressable Microencapsulated Ink and Display; Jacobson et al., U.S. Pat. No. 6,323,989 entitled Electrophoretic Displays Using Nanoparticles; Albert, U.S. Pat. No. 6,300,932 entitled Electrophoretic Displays with Luminescent Particles and Materials for Making the Same or, Comiskey et al., U.S. Pat. No. 6,327,072 entitled Microcell Electrophoretic Displays.

Figure 6:
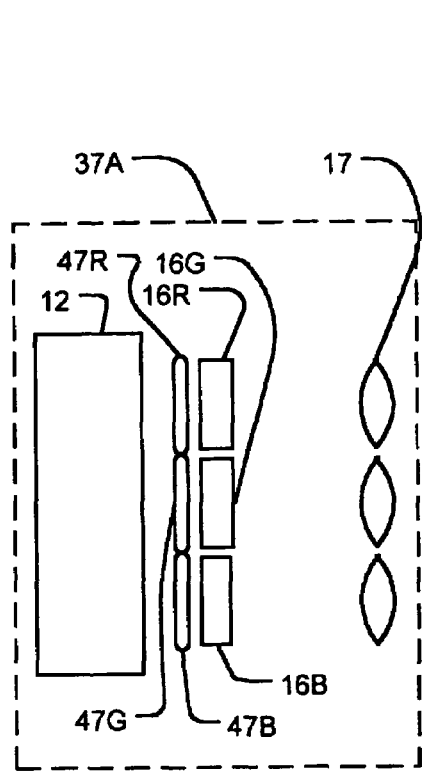
FIG. 6 is a schematic illustration of a front-projection-type color display having an alternative projector construction.
Figure 6A:
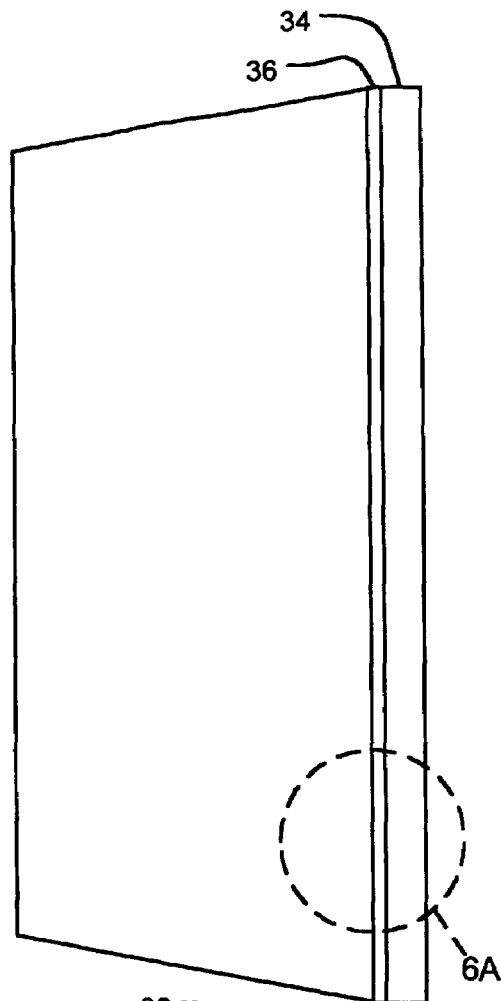
FIGS. 6A and 6B are expanded cross-sectional views of portions of the front-projection screen of the color display of FIG. 6.
Figure 6A:
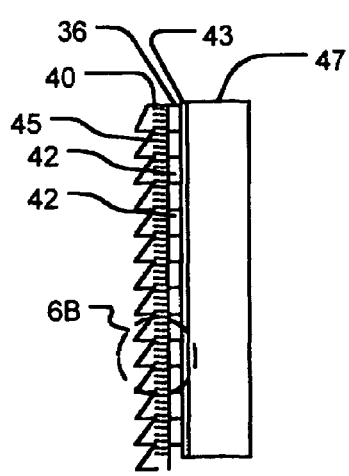
Figure 6B:
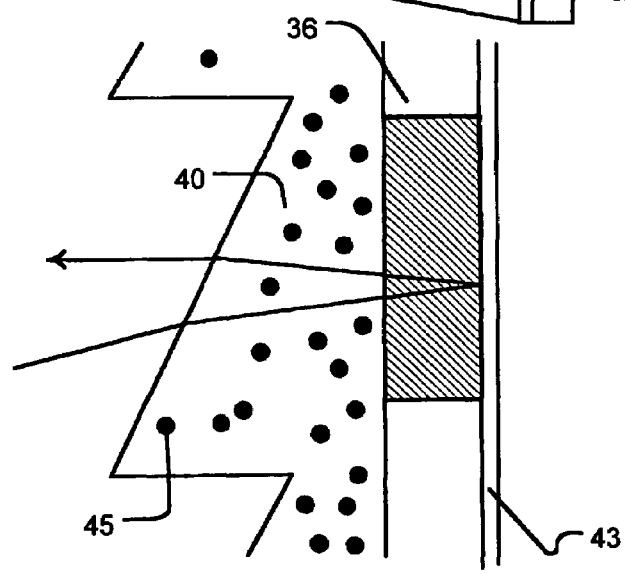

As shown in FIGS. 6A and 6B, screen 34 preferably comprises a lens element 40 which functions to direct light preferentially toward the eyes of viewers. In the illustrated embodiment, lens element 40 comprises a Fresnel lens having a focal point substantially coincident with the apex of the cone of light originating from projector 37. Lens element 40 could comprise another kind of lens such as a holographic lens. Lens element 40 incorporates scattering centers 45 which provide a desired degree of diffusion in the light reflected from screen 34. In the illustrated embodiment, second light modulator 36 comprises a reflective LCD panel having a large number of pixels 42 backed by a reflective layer 43 and mounted on a backing 47.

Where light modulator 36 comprises an array of elements having variable retro-reflection properties, the elements themselves could be designed to direct retro-reflected light preferentially in a direction of a viewing area in front of screen 34. Reflective layer 43 may be patterned to scatter light to either augment the effect of scattering centers 45 or replace scattering centers 45.

As shown in FIG. 4, a controller 39 provides data defining image 38 to each of first light modulator 16 and second light modulator 36. Controller 39 could comprise, for example, a computer equipped with a suitable display adapter. The luminance of any point on screen 34 is determined by the combined effect of the pixels in first light modulator 16 and second light modulator 36 which correspond to that point. There is minimum luminance at points for which corresponding pixels of the first and second light modulators are set to their "darkest" states. There is maximum luminance at points for which corresponding pixels of the first and second light modulators are set to their "brightest" states. Other points have intermediate luminance values. The maximum luminance value might be, for example, on the order of $10^5$ cd/m$^2$. The minimum luminance value might be, for example on the order of $10^{-2}$ cd/m$^2$.

The cost of a light modulator and its associated control circuitry tends to increase with the number of addressable elements in the light modulator. In some embodiments of the invention one of the light modulators has a spatial resolution significantly higher than that of one or more other ones of the light modulators. When one or more of the light modulators are lower-resolution devices the cost of a display according to such embodiments of the invention may be reduced. In color displays comprising two or more light modulators, one of which is a color light modulator (a combination of a plurality of monochrome light modulators may constitute a color light modulator as shown, for example, in FIG. 6) and one of which is a higher-resolution light modulator, the higher-resolution light modulator should also be the color light modulator. In some embodiments the higher-resolution light modulator is imaged onto the lower-resolution light modulator. In other embodiments the lower-resolution light modulator is imaged onto the higher-resolution light modulator.

Figure 5:
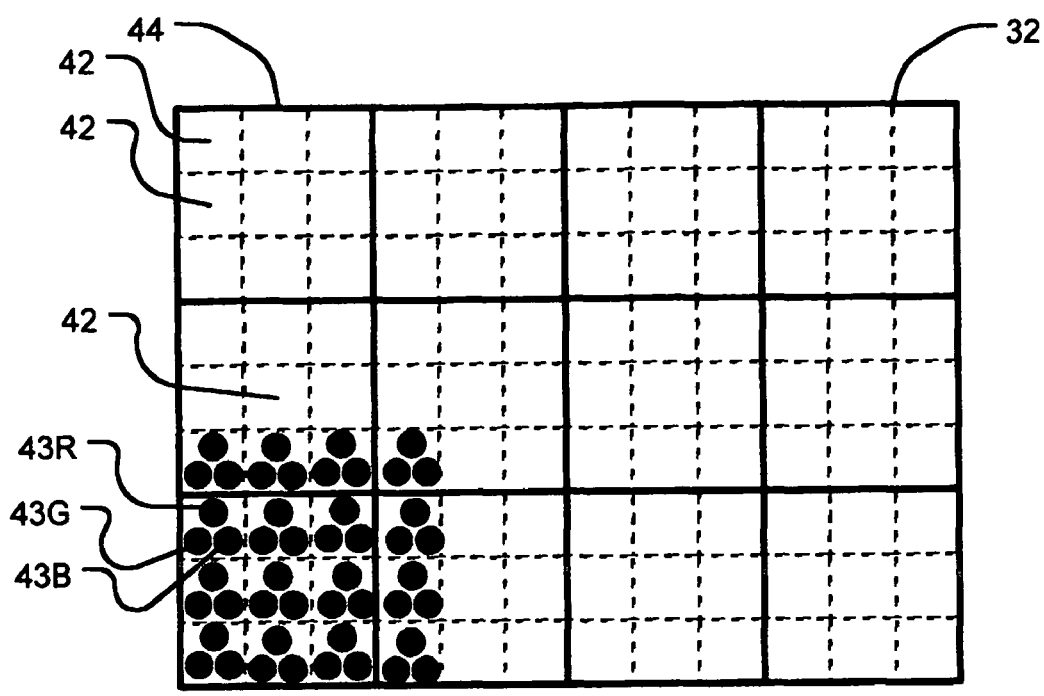
FIG. 5 is a drawing illustrating a possible relationship between pixels in a higher-resolution spatial light modulator and pixels in a lower-resolution spatial light modulator in a display according to the invention.

FIG. 5 illustrates one possible configuration of pixels in a display 10 as shown in FIG. 1. Nine pixels 42 of a second light modulator 20 correspond to each pixel 44 of a first light modulator 16. The number of pixels 42 of second light modulator 20 which correspond to each pixel 44 of first light modulator 16 may be varied as a matter of design choice. Pixels 44 of the higher-resolution one of first and second light modulators 16 and 20 (or 36) should be small enough to provide a desired overall resolution. In general there is a trade off between increasing resolution and increasing cost. In a typical display the higher-resolution light modulator will provide an array of pixels having at least a few hundred pixels in each direction and more typically over 1000 pixels in each direction.

Figure 5A:
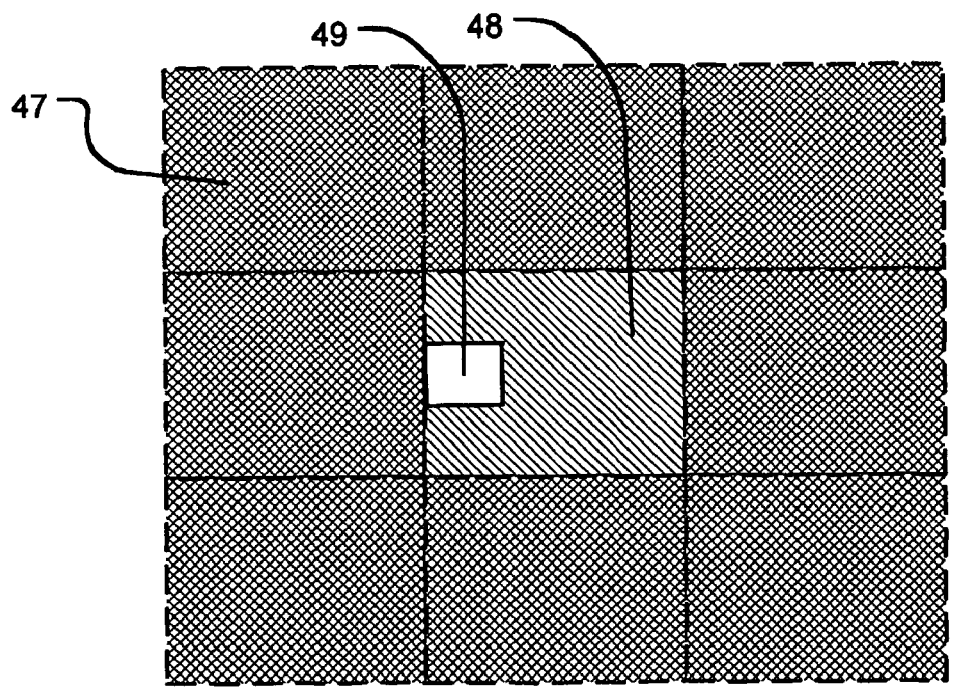
FIG. 5A illustrates an effect of providing one light modulator which has lower resolution than another light modulator.

The size of pixels 42 of the lower-resolution one of the first and second light modulators determines the scale over which one can reliably go from maximum intensity to minimum intensity. Consider, for example, FIG. 5A which depicts a situation where one wishes to display an image of a small maximum-luminance spot on a large minimum-luminance background. To obtain maximum luminance in a spot 47, those pixels of each of the first and second light modulators which correspond to spot 47 should be set to their maximum-luminance values. Where the pixels of one light modulator are lower in resolution than pixels of the other light modulator then some pixels of the lower-resolution light modulator will straddle the boundary of spot 47. This is the case, for example, in FIG. 5A.

Outside of spot 47 there are two regions. In region 48 it is not possible to set the luminance to its minimum value because in that region the lower-resolution light modulator is set to its highest luminance value. In region 49 both of the light modulators can be set to their lowest-luminance values. If, for example, each of the first and second light modulators has a luminance range of 1 to 100 units, then region 47 might have a luminance of 100×100=10,000 units, region 48 would have a luminance of 100×1=100 units and region 49 would have a luminance of 1×1=1 units.

As a result of having one of the light modulators lower in resolution than the other, each pixel of the lower-resolution light modulator corresponds to more than one pixel in the higher-resolution light modulator. It is not possible for points corresponding to any one pixel of the lower-resolution light modulator and different pixels of the higher-resolution light modulator to have luminance values at extremes of the device's dynamic range. The maximum difference in luminance between such points is determined by the dynamic range provided by the higher-resolution light modulator.

It is generally not a problem that a display is not capable of causing closely-spaced points to differ in luminance from one another by the full dynamic range of the display. The human eye has enough intrinsic scatter that it is incapable of appreciating large changes in luminance which occur over very short distances in any event.

In a display according to the invention which includes both a lower-resolution spatial light modulator and a higher-resolution spatial light modulator, controller 39 may determine a value for each pixel of the lower-resolution spatial light modulator and adjust the signals which control the higher-resolution spatial light modulator to reduce artefacts which result from the fact that each pixel of the lower-resolution spatial light modulator is common to a plurality of pixels of the higher-resolution spatial light modulator. This may be done in any of a wide number of ways.

To take but one example, consider the case where each pixel of the lower-resolution spatial light modulator corresponds to a plurality of pixels of the higher-resolution spatial light modulator. Image data specifying a desired image is supplied to the controller. The image data indicates a desired luminance for an image area corresponding to each of the pixels of the higher-resolution spatial light modulator. The controller may set the pixels of the lower-resolution light modulator to provide an approximation of the desired image. This could be accomplished, for example, by determining an average or weighted average of the desired luminance values for the image areas corresponding to each pixel of the lower-resolution display.

The controller may then set the pixels of the higher-resolution display to cause the resulting image to approach the desired image. This could be done, for example, by dividing the desired luminance values by the intensity of light incident from the lower-resolution light modulator on the corresponding pixels of the higher-resolution light modulator. The intensity of light incident from the lower-resolution light modulator on a pixel of the higher-resolution light modulator can be computed from the known way that light from each pixel of the lower resolution spatial light modulator is distributed on the higher resolution spatial light modulator. The contributions from one or more of the pixels of the lower resolution spatial light modulator can be summed to determine the intensity with which any pixel of the higher resolution spatial light modulator will be illuminated for the way in which the pixels of the lower resolution spatial light modulator are set.

If the low-resolution pixels are too large then a viewer may be able to discern a halo around bright elements in an image. The low resolution pixels are preferably small enough that the appearance of bright patches on dark backgrounds or of dark spots on bright backgrounds is not unacceptably degraded. It is currently considered practical to provide in the range of about 8 to about 144, more preferably about 9 to 36, pixels on the higher-resolution light modulator for each pixel of the lower-resolution light modulator.

The sizes of steps in which each of pixels 42 and 44 can adjust the luminance of point(s) on the image are not necessarily equal. The pixels of the lower-resolution light modulator may adjust light intensity in coarser steps than the pixels of the higher-resolution light modulator. For example, the lower-resolution light modulator may permit adjustment of light intensity for each pixel over an intensity range of 1 to 512 units in 8 steps while the higher-resolution light modulator may permit adjustment of the light intensity for each pixel over a similar range in 512 steps. While pixels 42 and 44 are both illustrated as being square in FIG. 5, this is not necessary. Pixels 42 and/or 44 could be other shapes, such as rectangular, triangular, hexagonal, round, or oval.

Figure 7:
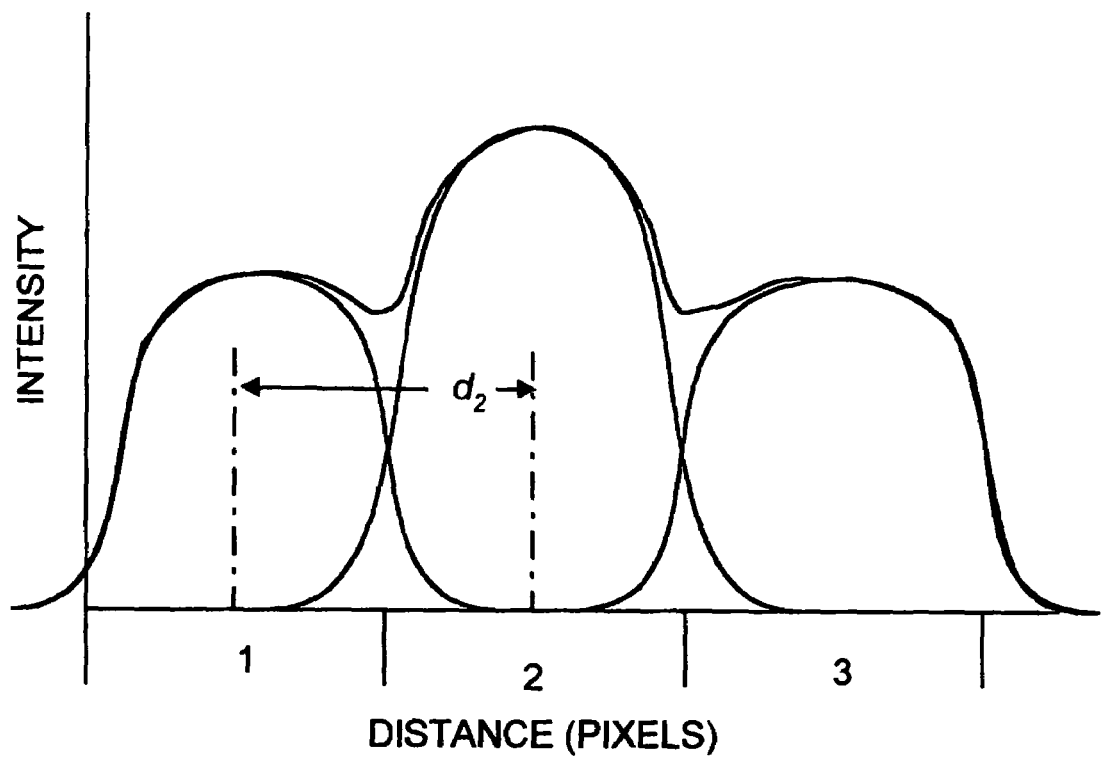
FIG. 7 is a graph illustrating how light imaged onto a higher-resolution light modulator from pixels of a lower-resolution light modulator can overlap to yield a smooth variation in light intensity with position.
Figure 7A:
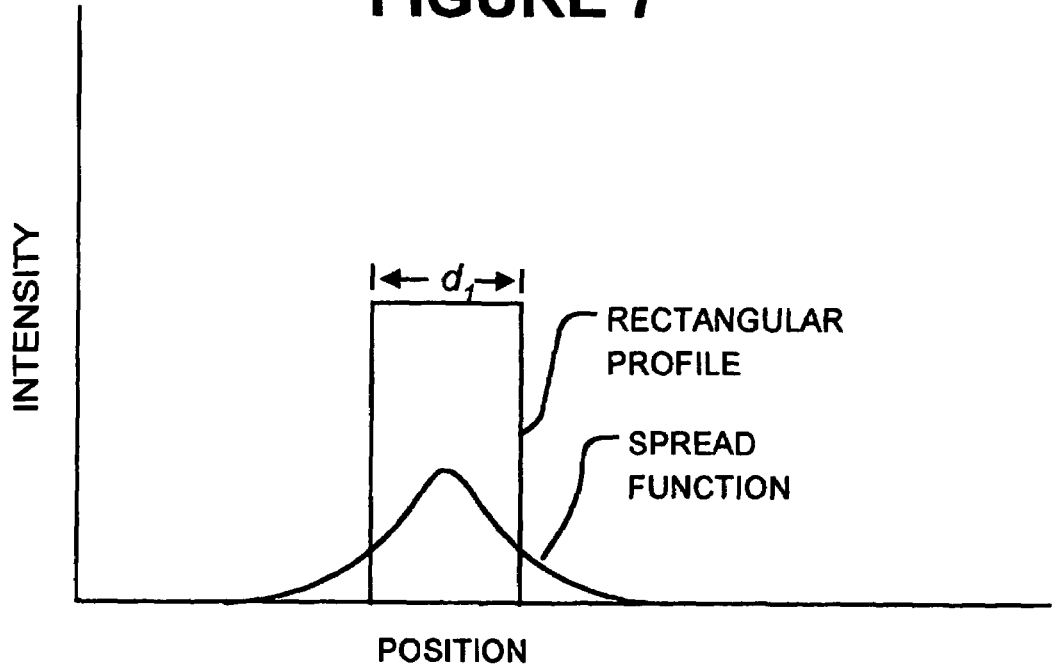
FIG. 7A is a graph illustrating how the variation in light intensity with position for the image of a pixel of a light modulator can be represented as the convolution of a square profile and a spread function.

The pixels of the lower-resolution light modulator preferably emit light which is somewhat diffuse so that the light intensity varies reasonably smoothly as one traverses pixels of the lower-resolution light modulator. This is the case where the light from each of the pixels of the lower-resolution light modulator spreads into adjacent pixels, as shown in FIG. 7. As shown in FIG. 7A, the intensity profile of a pixel in the lower-resolution light modulator can often be approximated by gaussian spread function convolved with a rectangular profile having a width $d_1$ equal to the active width of the pixel. The spread function preferably has a full width at half maximum in the range of $0.3 \times d_2$ to $3 \times d_2$, where $d_2$ is the centerto-center inter-pixel spacing, to yield the desired smoothly varying light intensity. Typically $d_1$ is nearly equal to $d_2$.

In the embodiment of FIG. 5, each pixel 42 comprises three sub pixels 43R, 43G and 43B (for clarity FIG. 5 omits sub pixels for some pixels 42). Sub-pixels 43R, 43G and 43B are independently addressable. They are respectively associated with red, green and blue color filters which are integrated into second light modulator 20. Various constructions of LCD panels which include a number of colored sub-pixels and are suitable for use in this invention are known in the art.

For front projection-type displays (for example the display 10C of FIG. 4), it is typically most practical for first light modulator 16 to comprise a high-resolution light modulator which provides color information and for light modulator 36 to comprise a monochrome light modulator. Light modulator 36 preferably has reasonably small addressable elements so that the boundaries of its elements do not form a visually distracting pattern. For example, light modulator 36 may have the same number of addressable elements as projector 37 (although each such element will typically have significantly larger dimensions than the corresponding element in light modulator 16 of projector 37).

Projector 37 may have any suitable construction. All that is required is that projector 37 be able to project light which has been spatially modulated to provide an image onto screen 34. FIG. 6 illustrates a display system 10D according to a further alternative embodiment of the invention. System 10D comprises a screen 34 which has an integrated light modulator 36 as described above with reference to FIG. 4. System 10D comprises a projector 37A which has separate light modulators 16R, 16G and 16R for each of three colors. Light modulated by each of light modulators 16R, 16G and 16R is filtered by a corresponding one of three colored filters 47R, 47G and 47B. The modulated light is projected onto screen 34 by optical systems 17. A single light source 12 may supply light to all three light modulators 16R, 16G, and 16B, or separate light sources (not shown) may be provided.

In the embodiments described above, light from a light source is spatially modulated by a first light modulator and then imaged onto a second light modulator. The inventors have realized that the functions of the light source and first light modulator can be combined by providing a light source comprising an array of light-emitting elements which each have a controllable brightness. The light-emitting elements may be solid state devices. For example, the light-emitting elements may comprise light-emitting diodes (LEDs). Each of the LEDs may be driven by a driver circuit which allows the current flowing through the LED, and consequently the brightness of the light emitted by the LED, to be controlled. The controller may also, or in the alternative, control a duty cycle of the corresponding LED. As discussed below, the driving circuit may monitor current being delivered to each LED or each group of LEDs and may generate an error signal if the magnitude of the current being delivered to each LED or each group of LEDs has an unexpected value. Such error signals may be used by a controller to compensate for failed LEDs.

In a preferred embodiment of the invention, the LEDs are of a type which emit white light. For example, the LEDs may comprise an array of tri-color LEDs. Tri-color LEDs which each include red, green and blue LEDs all encapsulated within a single housing are commercially available. One or more white LEDs may be used to illuminate each group of pixels of the second light modulator.

Figure 8:
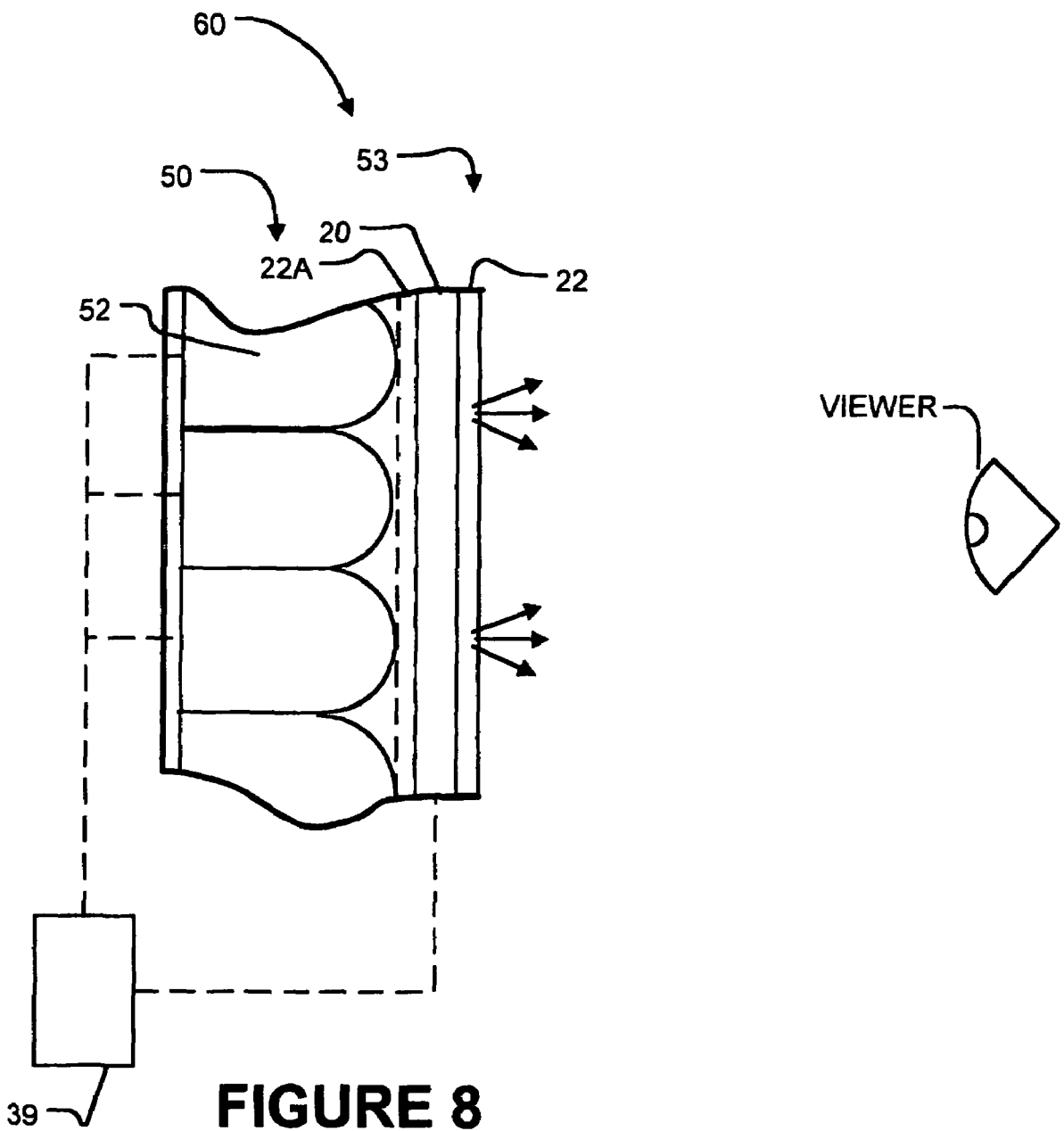
FIG. 8 is a schematic cross-section of a display according to an alternative embodiment of the invention and FIG. 8A is a schematic front view thereof.
Figure 8A:
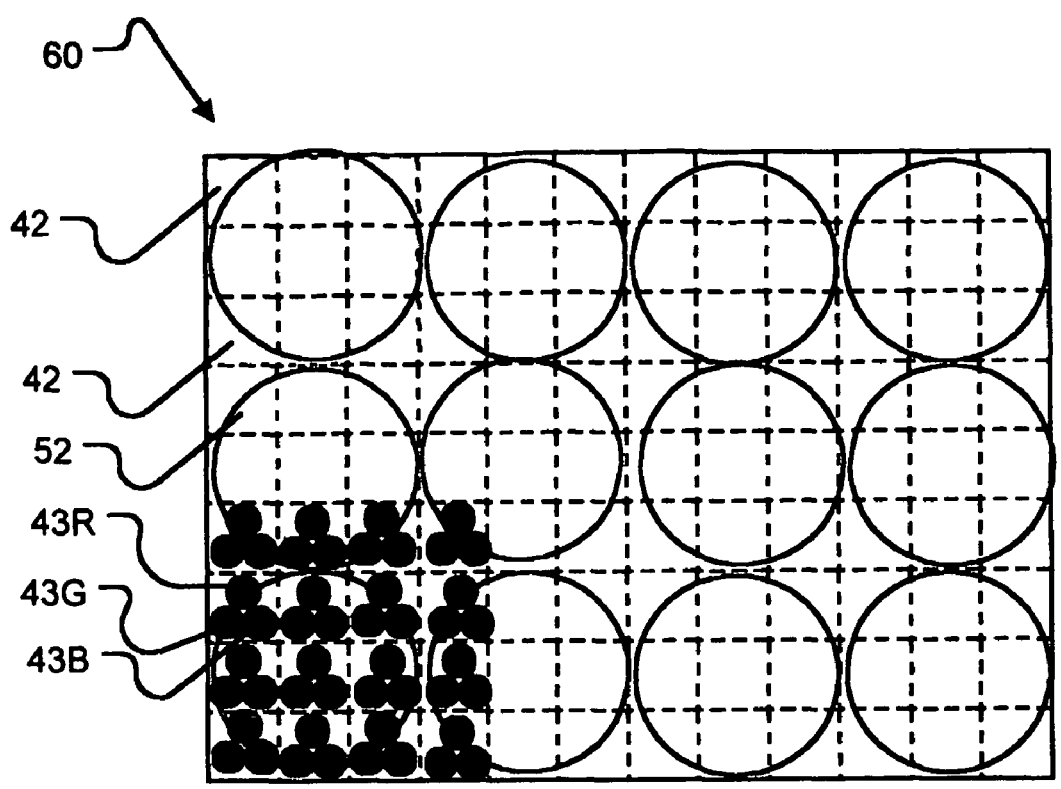

FIG. 8 shows a section through a display 60 according to an embodiment of the invention in which a rear-projection screen 53 comprising a diffusing layer 22 is illuminated by an array 50 of LEDs 52. The brightness of each LED 52 is controlled by a controller 39. Screen 53 includes a light modulator 20. The rear face of light modulator 20 is illuminated by LED array 50. FIG. 8A is a schematic front view of a portion of display 60 for a case where controllable elements (pixels) 42 of light modulator 20 correspond to each LED 52. Each of the controllable elements 42 may comprise a plurality of colored sub-pixels.

Figure 9A:
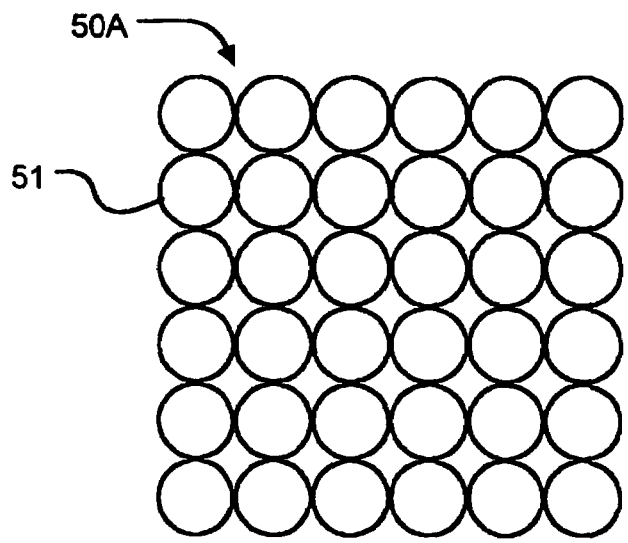
FIGS. 9A and 9B illustrate two possible configurations for an array of light emitting elements which could be used in the embodiment of FIG. 8.
Figure 9B:
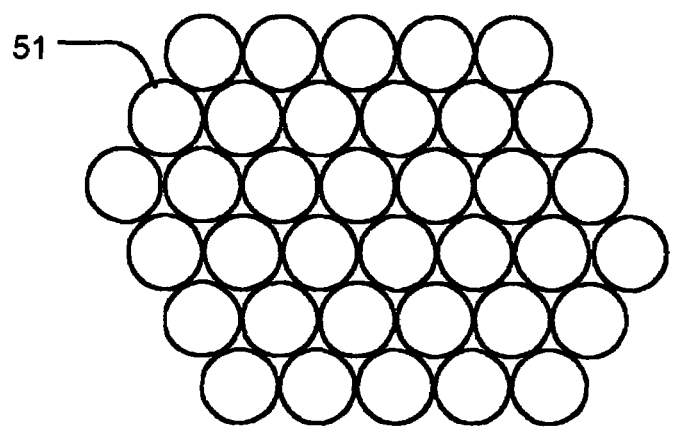

LEDs 52 may be arranged in any suitable manner in array 50. Two likely arrangements of LEDs 52 are shown in FIGS. 9A and 9B. FIG. 9A illustrates a rectangular array 50A of light sources 51. FIG. 9B illustrates a hexagonal array 50B of light sources 51. Light sources 51 may comprise LEDs 52. Where light sources 51 comprise discrete devices, a regular spacing between light sources 51 may be maintained by packing light sources 51 together as illustrated in FIG. 9A or 9B, for example.

A diffuser 22A in conjunction with the light-emitting characteristics of LEDs 52 causes the variation in intensity of light from LEDs 52 over the rear face of light modulator 20 to be smooth.

A similar effect can be obtained without a diffuser 22A by spacing light modulator 20 away from LEDs 52. Where light modulator 20 is spaced away from LEDs 52, light from each LED 52 can contribute to illuminating edges of the areas of spatial light modulator 20 corresponding to neighboring LEDs 52.

Figure 8B:
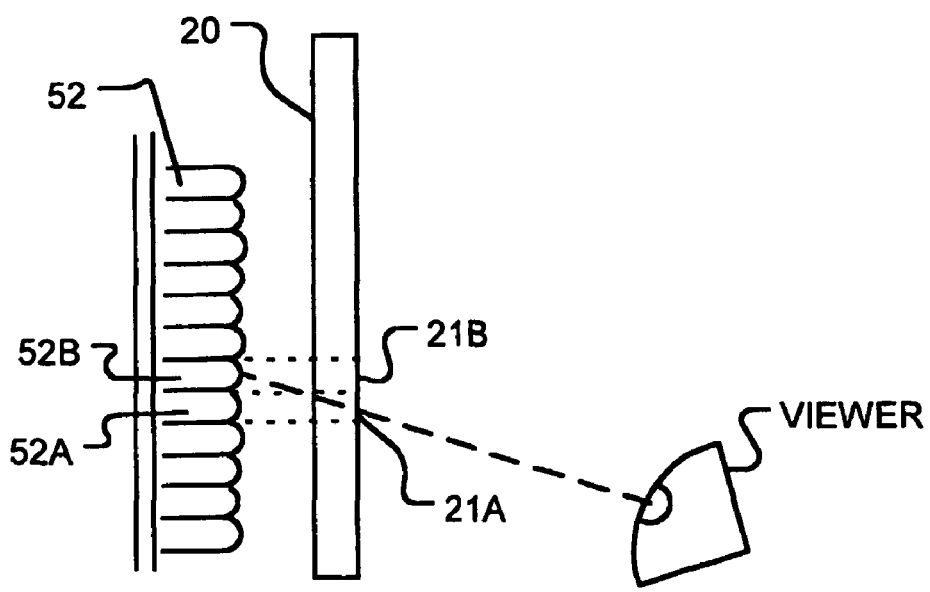
FIG. 8B is a schematic cross section of a display in which a spatial light modulator is spaced in front of an array of light sources.

In cases where it is necessary that the display be viewable through a large range of angles, such spacing can cause a parallax problem. Where a viewer is not viewing a display head-on, as shown in FIG. 8B, the viewer may see a pixel of spatial light modulator 20 illuminated by an LED 52 which does not correspond to the pixel. For example, in FIG. 8B, area 21A corresponds to LED 52A and area 21B corresponds to LED 52B. However, due to parallax, the viewer sees pixels in area 21A as being illuminated by LED 52B.

Figure 8D:
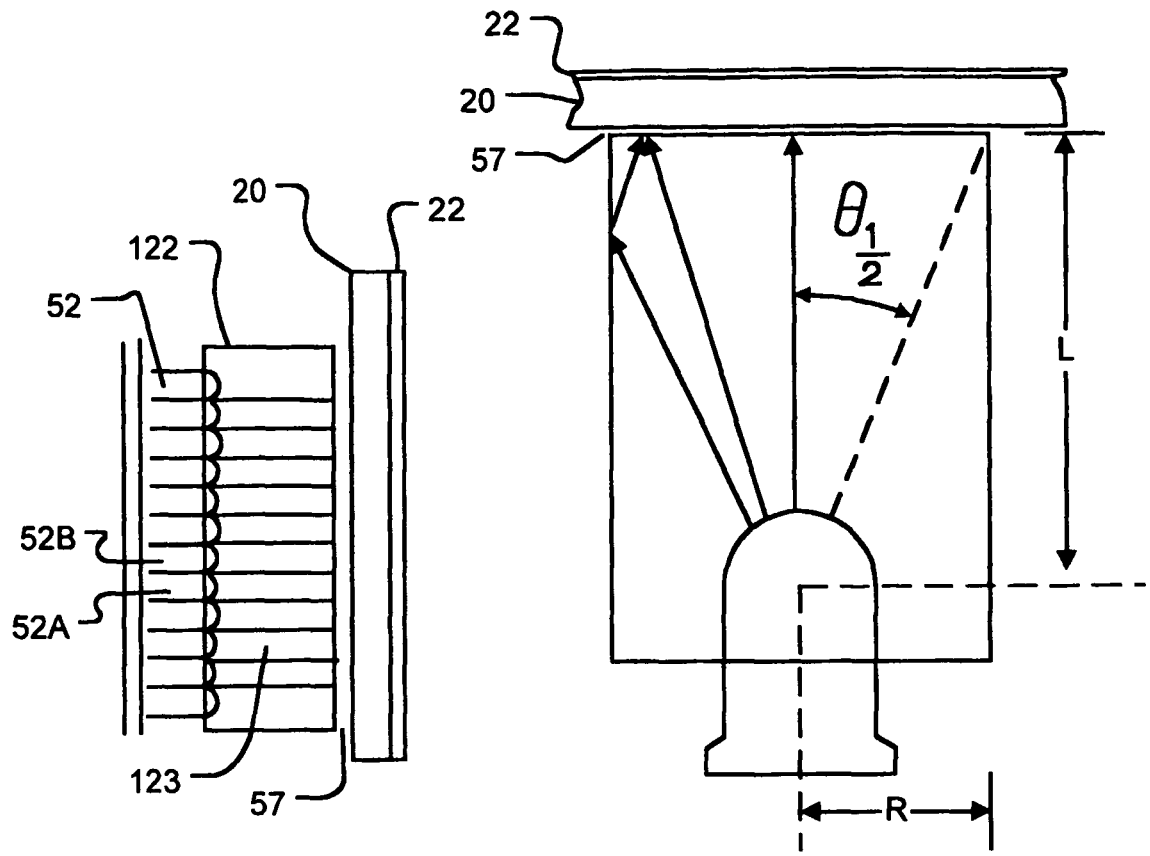
FIG. 8D is an isometric view of a hexagonal grid.
Figure 8D:
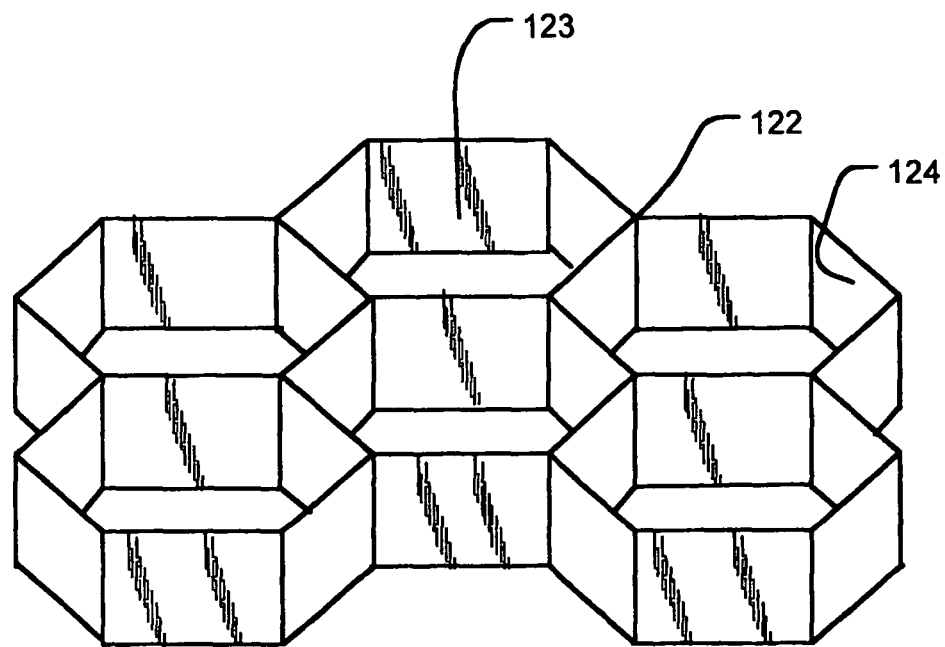

FIG. 8C shows an alternative construction which avoids the parallax problem illustrated by FIG. 8B. In FIG. 8C, a grid 122 of reflective-walled channels 123 is disposed between array 50 and spatial light modulator 20. In a preferred embodiment, channels 123 are hexagonal in cross section and grid 122 comprises a honeycomb structure as shown in FIG. 8D. Channels 123 could also have other cross sectional shapes such as square, triangular, rectangular or the like. The walls which define channels 123 are preferably thin. Grid 122 could comprise, for example, a section of aluminum honeycomb material.

Figure 8F:
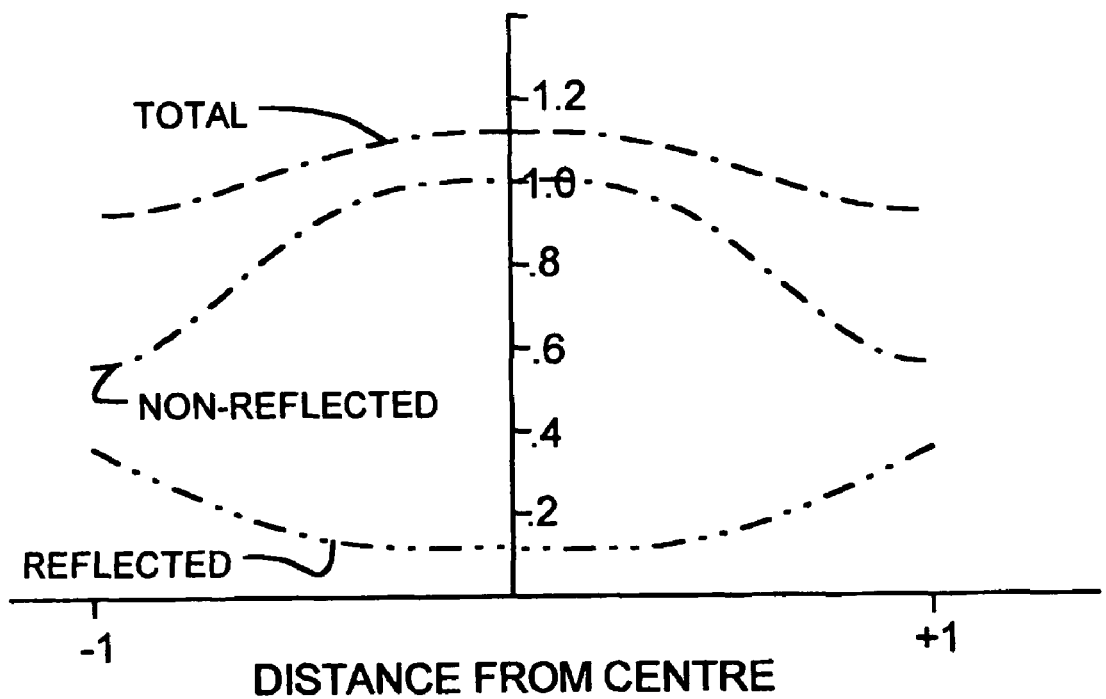
FIG. 8F is a graph showing how reflected and non-reflected light components can sum to provide improved uniformity of illumination.
Figure 8G:
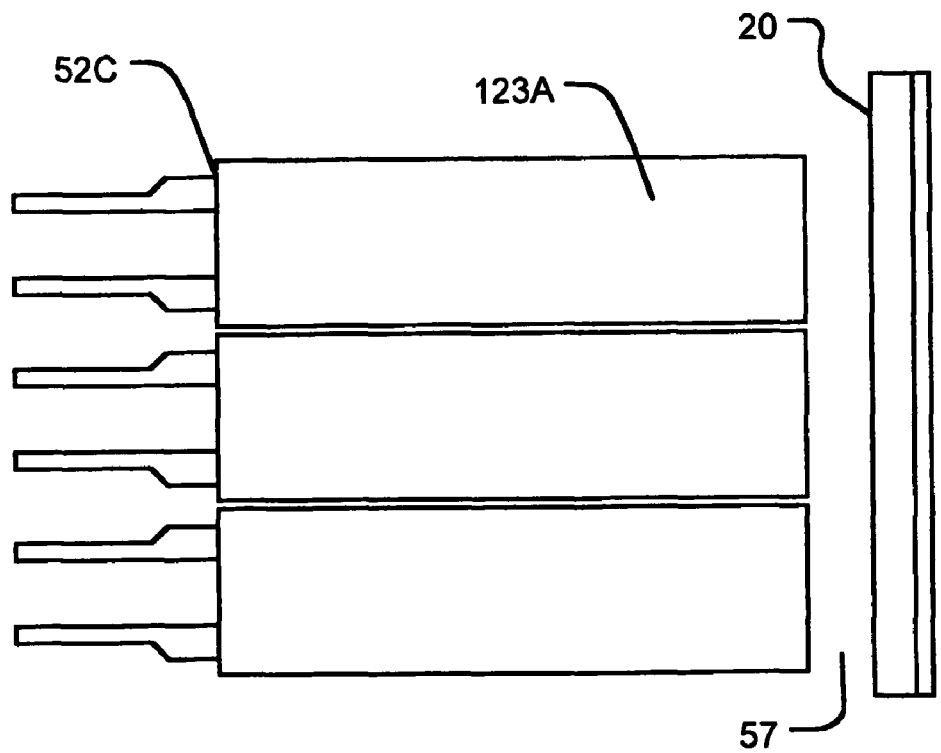
FIG. 8G is a schematic representation of a display wherein internally reflecting members which form a grid are formed integrally with the material encapsulating LEDs.

Channels 123 may be, but are not necessarily hollow. Channels 123 may be provided by columns of light-transmitting material having walls at which light is internally reflected, preferably totally internally reflected. The columns may be separated by thin air gaps or clad in one or more materials which provide an interface at which light is internally reflected. The columns may be integral with the material in which LEDs 52 are encapsulated. FIG. 8G shows an embodiment of the invention in which columns 123A having internally reflecting walls are integrally formed with LEDs 52C. Columns 123A may have various cross sectional shapes such as hexagonal, triangular, square or the like.

Light from each LED 52 passes through a channel 123. As shown in FIG. 8E, some light from an LED passes straight through channel 123 and some light is reflected from reflective walls 124 of channel 123. The luminance at a point on spatial light modulator 20 is contributed to by both reflected and non-reflected light. The reflected component tends to be more intense around the edges of channel 123 while the non-reflected component tends to be more intense toward the center of channel 123. The result is that the uniformity with which each LED 52 illuminates the corresponding portion of spatial light modulator 20 is improved by the presence of grid 122. The increase in uniformity is illustrated in FIG. 8F.

Grid 122 is spaced slightly away from spatial light modulator 20 by a gap 57 (see FIGS. 8C and 8E) to avoid perceptible shadows cast by the walls which separate adjacent channels 123 of grid 122.

The geometry of channels 123 may be varied to achieve design goals. The width of each channel 123 largely determines the resolution with which the intensity of light falling on spatial light modulator 20 can be varied. For a given channel width and cross sectional shape, the uniformity of illumination provided by each channel 123 can be increased by making the channel 123 longer. This, however, reduces the efficiency with which light is passed to spatial light modulator 20.

A reasonable trade off between efficiency and uniformity of illumination may be achieved by providing channels 123 which have lengths L such that near the channel edges non-reflected and once-reflected light components are each approximately half of the intensity of the non-reflected component on the axis of LED 52. One way to approximately achieve this is to choose length L such that the angle θ between the axis of LED 52 and the edge of channel 123 is equal to the half angle $\theta_{1/2}$ of the LED 52. The half angle is the angle at which the illumination provided by LED 52 has an intensity equal to one half of the intensity of illumination in a forward direction on the axis of LED 52. This condition is provided by making L satisfy the condition of equation (1), where R is the half-width of channel 123.

$$L = \frac{R}{\tan(\theta_{1/2})} \quad (1)$$

It is generally desirable to provide one channel 123 for each LED or other light source. In some embodiments of the invention each channel 123 has a plurality of LEDs. In one embodiment of the invention each channel 123 has three LEDs of different colors, for example, red, green and blue. In such embodiments it is important that the channel 123 be long enough that light from each of the LEDs be uniformly distributed at spatial light modulator 20 as the human eye is sensitive to variations in color.

As described above, with reference to FIGS. 7 and 7A, light modulator 20 is preferably illuminated in a manner such that the illumination of light modulator 20 by LED array 50 changes smoothly with position on light modulator 20. This can be accomplished by providing LEDs 52 in LED array 50 which emit light in patterns which overlap somewhat on light modulator 20. The light emitted by each LED 52 may be characterized by a spread function such that the variation of the intensity of light from an LED 52 incident on light modulator 20 is the convolution of a rectangular profile and the spread function. The spread function preferably has a full width at half maximum in the range of $0.3 \times d_2$ to $3 \times d_2$, where $d_2$ is the center-to-center spacing on light modulator 20 between the illumination patterns of adjacent LEDs 52 on light modulator 20. A diffuser 22A (shown in dashed lines FIG. 8) may be interposed between array 50 and light modulator 20 to broaden the illumination patterns of LEDs 52 on light modulator 20.

Figure 9C:
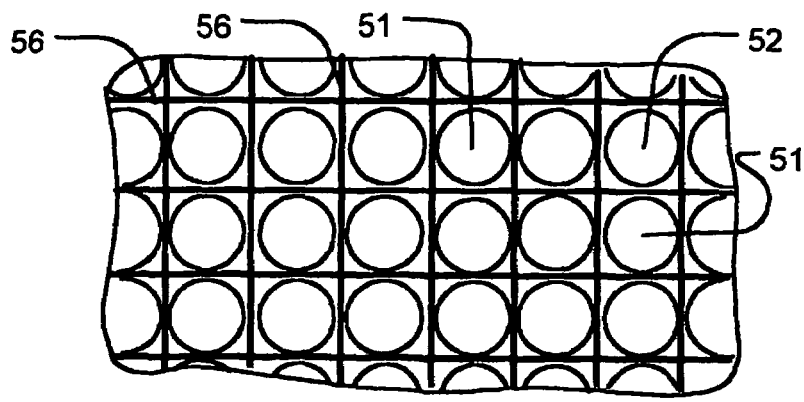
FIG. 9C illustrates the use of light barriers to provide increased sharpness.

For some applications it may be desirable to provide a display on which the level of illumination of closely spaced pixels may be greatly different. This may be achieved, at the cost of some smoothness, by confining light originating from each of the light sources of array 50 so that the illumination patterns of adjacent light sources on light modulator 20 do not overlap significantly. This may be achieved, for example, by providing light barriers 56 which limit the spread of light from each of the light sources of array 50 as shown in FIG. 9C. With light barriers 56, each light source of array 50 illuminates only corresponding pixels of light modulator 20. This may also be achieved by providing light sources 52 which project substantially non-overlapping illumination patterns onto light modulator 20. In either case, the resulting image displayed to a viewer may appear somewhat sharper than in embodiments wherein light from each light source 52 is permitted to spread sufficiently that it provides significant illumination to some pixels corresponding to adjacent light sources. In many cases, limitations of the human eye will make this increased level of sharpness unnoticeable.

Light modulator 20 may be a monochrome light modulator. In the alternative, light modulator 20 may be a high resolution color light modulator. Light modulator 20 may comprise, for example, a LCD array. Display 60 can be quite thin. For example, display 60 may be 10 centimeters or less in thickness.

Figure 10:
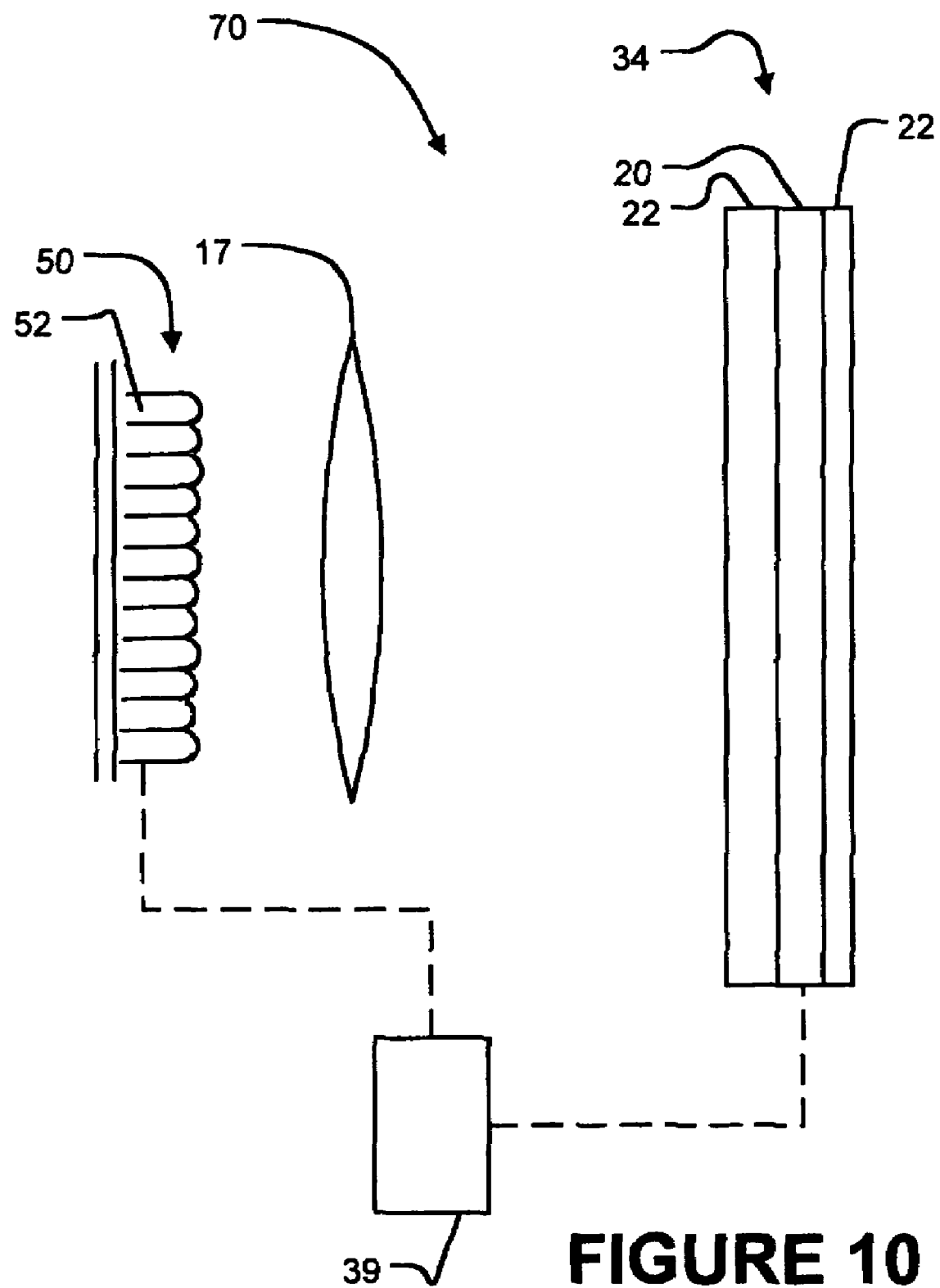
FIG. 10 is a schematic illustration of a projection-type display according to an alternative embodiment of the invention.

FIG. 10 shows a projection-type display 70 which is similar to display 60 of FIG. 8 except that an array 50 of light sources 52 is imaged onto a light modulator 20 by a suitable optical system 17.

A controller 39 may control the elements of array 50 to provide a low-resolution version of an image to be displayed on spatial light modulator 20. Controller 39 may control the elements of spatial light modulator 20 to supply features having a high spatial resolution and to otherwise correct the image provided by array 50 as described above.

One problem with using LEDs 52 as light sources in a high resolution high quality display is that the brightness of light emitted at a specific current level can vary significantly between individual LEDs. This variation is due to manufacturing process variations. Further, the brightness of light that a LED 52 will produce tends to slowly decrease in an unpredictable manner as the LED ages. It is therefore desirable to provide a mechanism for calibrating an LED array 50 to compensate for differences in brightness between different LEDs 52 in array 50.

Figure 11:
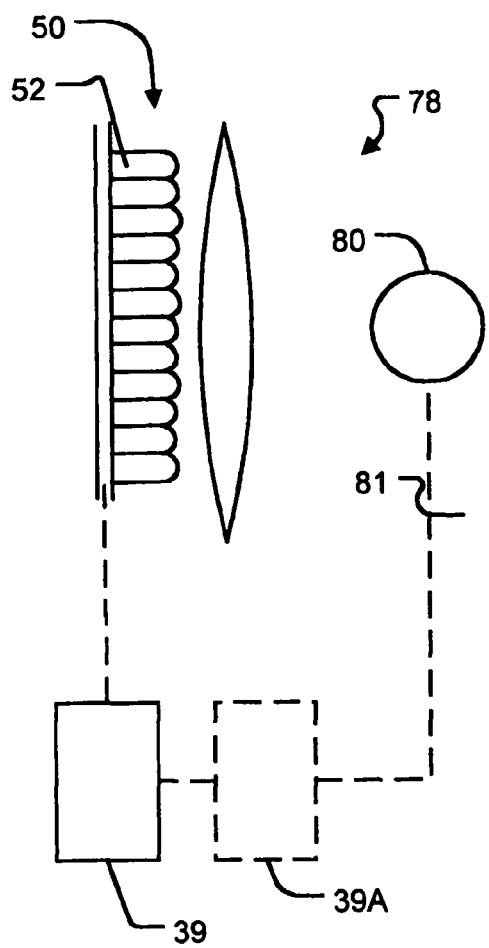
FIG. 11 is a block diagram of a calibration mechanism.

One calibration mechanism 78 which is illustrated schematically in FIG. 11 provides a light detector 80 which detects light emitted by each of LEDs 52. Light detector 80 may be moved into different positions for capturing light from different LEDs 52. In the alternative, a suitable optical system may be provided to direct light from LEDs 52 to light detector 80. Controller 39 receives a signal 81 from light detector 80. Signal 81 indicates the brightness of light emitted by each LED 52 in array 50 for a given current. If the brightness of light emitted by an LED 52 differs from a desired value then controller 39 determines a correction to be applied to the current applied to each LED 52. Controller 39 subsequently applies the correction. Calibration mechanism 78 may be used for initial calibration of a display. Calibration mechanism 78 may optionally include a calibration controller 39A which performs some calibration tasks, such as determining a correction to be applied to the current applied to each LED 52, and making the resulting calibration information available to controller 39.

It is desirable to provide a calibration mechanism that does not interfere with the normal operation of a display. One way to achieve this is to detect light which is emitted by an LED in a direction other than the forward direction. FIG. 11A shows a typical LED 52. Most light emitted by LED 52 is directed in a forward direction as shown by arrow 55A. A very small fraction of the light emitted by each LED 52 is emitted sideways as indicated by arrows 55B or rearwardly as indicated by arrow 55C. Light emitted in a direction other than the forward direction may be termed "stray light". One or more light detectors 80A may be located to detect stray light from each LED 52.

Figure 11B:
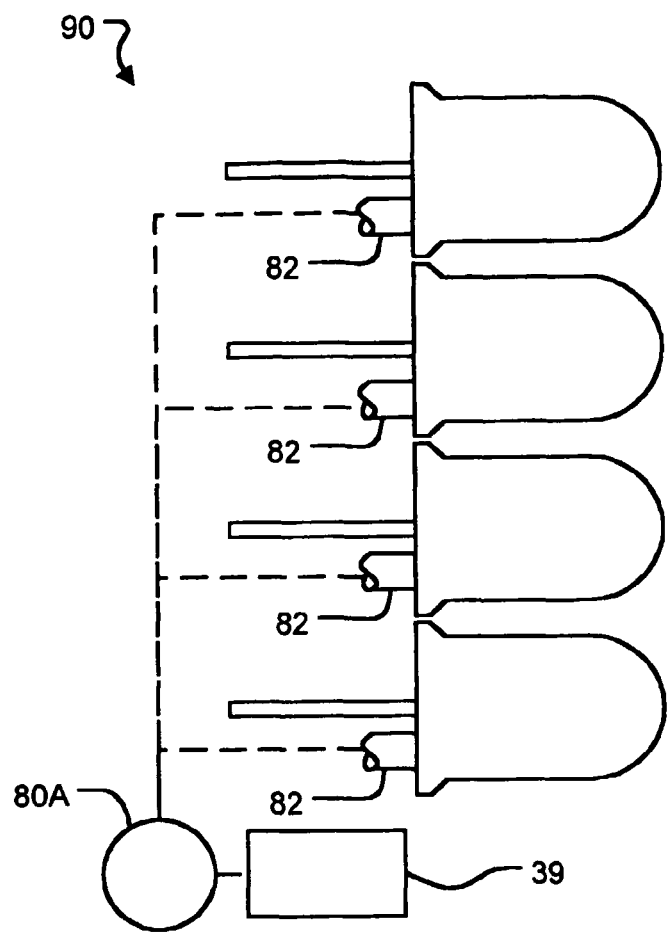
FIG. 11A is a depiction of an LED illustrating paths by which stray light exits the LED; and, FIGS. 11B, 11C, 11D and 11E are schematic diagrams of alternative calibration mechanisms.
Figure 11A:
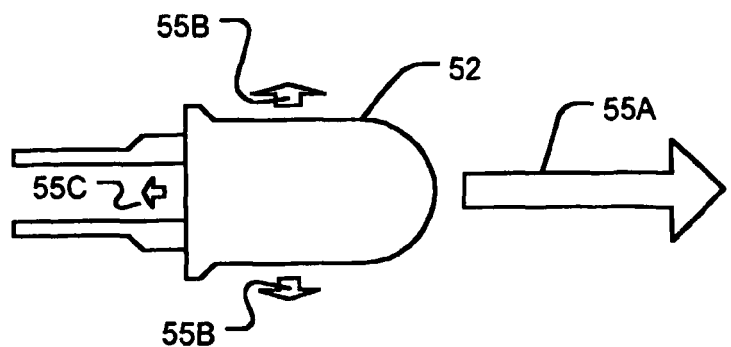

A calibration mechanism 90 according to one embodiment of the invention is shown in FIG. 11B. In calibration mechanism 90, small optical waveguides 82 carry stray light from LEDs 52 to a light detector 80. Only a small fraction of the light emitted by each LED 52 is captured by waveguides 82. As long as the coupling between a waveguide 82 and the corresponding LED 52 does not change, the proportion of the light emitted by an LED 52 which is captured by waveguide 82 remains constant. One light detector 80A or a few light detectors 80A may be located at convenient locations such as at edges of array 50.

FIG. 11C shows a calibration mechanism 90A according to another embodiment of the invention. In mechanism 90A, individual optical waveguides 82 are replaced by a planar optical waveguide 82A. Power leads for LEDs 52 pass through holes 83 in waveguide 82A. One or more light detectors 80A are located at edges of optical waveguide 82A. Light emitted in the rearward direction by any of LEDs 52 is trapped within optical waveguide 82A and detected by light detector(s) 80A.

FIG. 11D shows another optical calibration mechanism 90B wherein a planar optical waveguide 82B collects light emitted by LEDs 52 in sideways directions and carries that light to one or more light detectors 80A.

Figure 11E:
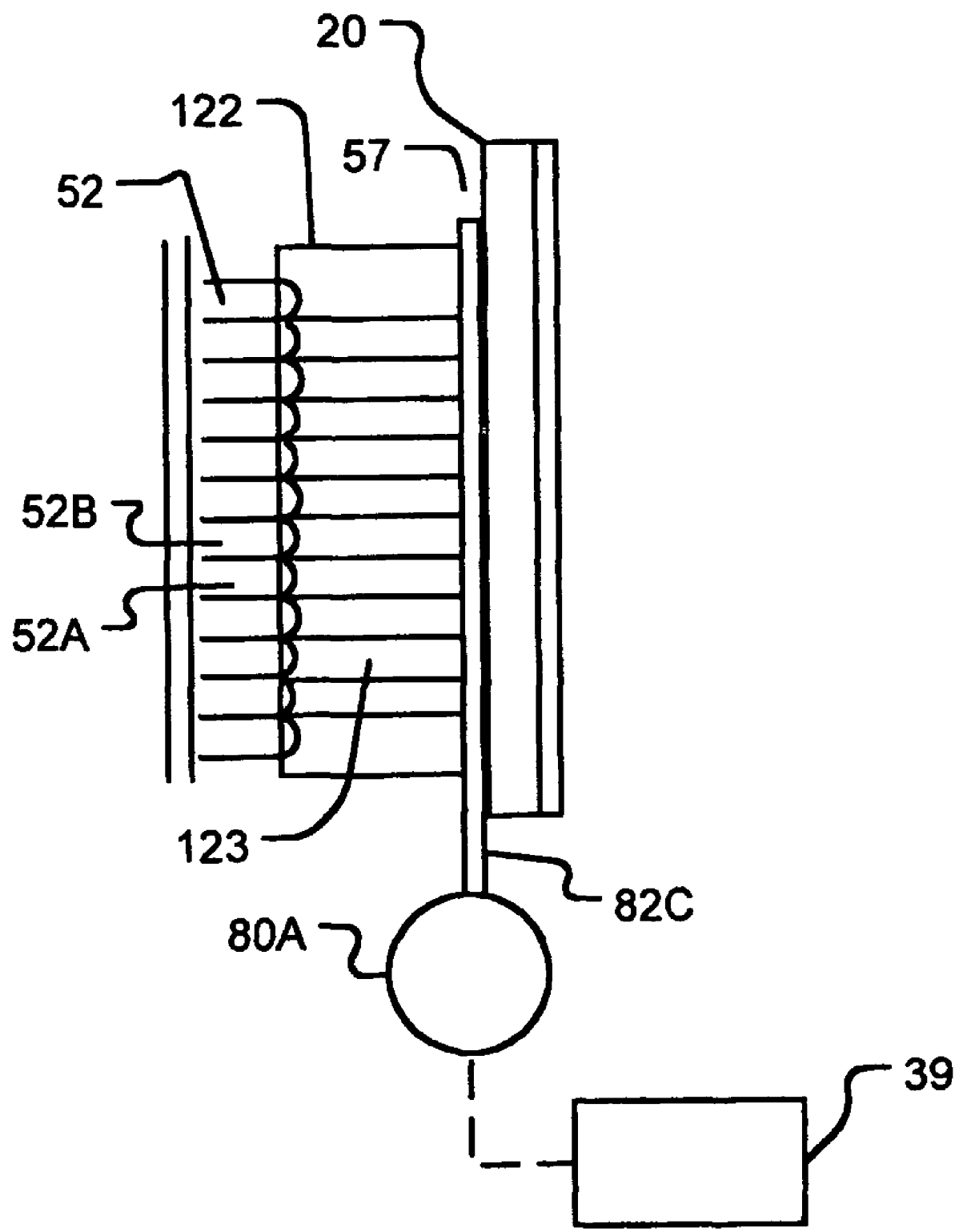

FIG. 11E shows another optical calibration mechanism 90C wherein a planar optical waveguide 82C collects a small fraction of the light emitted by LEDs 52 in the forward direction and carries that light to one or more light detectors 80A. Waveguide 82C is constructed so that some light passing through it in the forward direction is trapped in waveguide 82C and carried to light detector(s) 80A. To achieve this, one surface of waveguide 82C, typically the surface facing LEDs 52 may be roughened slightly to scatter some light generally into the plane of waveguide 82C or some scattering centers may be provided in the material of waveguide 82C. In the illustrated embodiment, waveguide 82C acts as a spacer which maintains a gap 57 between a grid 122 and spatial light modulator 20. Calibration mechanism 80C has the advantage that optical waveguide 82C does not need to be penetrated by holes 83 which can interfere with the propagation of light to light detector(s) 80A.

In operation, an array 50 is first factory calibrated, for example, with a calibration mechanism 78 (FIG. 11). After, or during, factory calibration LEDs 52 are turned on one at a time with current at a calibration level. Light detector(s) 80A are used to measure stray light for each LED 52. Information about the amount of stray light detected for each LED 52 may be stored as a reference value. Over the life of LED array 50, mechanism 90 can be used to monitor the brightness of each LED 52. Depending upon the application, such brightness measurements may be made at times when the display is initialized or periodically while the display is in use. Brightness measurements of one or more LEDs 52 may be made in intervals between the display of successive image frames.

If mechanism 90 detects that the brightness of an LED 52 has changed over time (typically as indicated by a decrease in the amount of stray light detected by light detector(s) 80A in comparison to the stored reference value) then controller 39 can automatically adjust the current provided to that LED 52 to compensate for its change in brightness.

A calibration mechanism 90 can also be used to detect failures of LEDs 52. Although LEDs 52 tend to be highly reliable they can fail. Calibration mechanism 90 can detect failure of an LED 52 by detecting no light from LED 52 when controller 39 is controlling LED 52 to be "ON". Certain failure modes of an LED 52 or a row of LEDs 52 may also be detected by LED driving electronics associated with controller 39. If the driving electronics detect that no current, or a current having an unexpected value, is being delivered at a time when current should be passing through one or more LEDs 50 then the driving electronics may generate an error signal detectable by controller 39.

Where controller 39 detects a failure of one or more LEDs 52, controller 39 may compensate for the failure(s) by increasing brightness of one or more neighboring LEDs 52, adjusting the elements of spatial light modulator 20 which correspond to the failed LED 52 to provide greater light transmission, or both. In fault tolerant displays according to this embodiment of the invention, after failure of an LED 52, spill over light from adjacent LEDs 52 illuminates the area corresponding to the failed LED 52 sufficiently to make the image visible in the area.

Where controller 39 is configured to increase the brightness of neighboring LEDs 52, controller 39 may determine the amount of increase based in part upon the image content of the area of spatial light modulator 20 corresponding to the failed LED. If the image content calls for the area to be bright then the brightness of neighboring LEDs may be increased more than if the image content calls for the area to be dark. The resulting image quality will be degraded but catastrophic failure will be avoided.

In some embodiments of the invention each LED 52 is dimmed or turned off during those times when the corresponding elements of spatial light modulator are being refreshed. Some spatial light modulators refresh slowly enough that the refresh can be perceived by a viewer. This causes an undesirable effect called "motion blur".

With proper timing, at those times when each row of spatial light modulator 20 is being refreshed, corresponding LEDs 52 can be off or dimmed. At other times the corresponding LEDs 52 can be overdriven sufficiently that a viewer perceives a desired brightness. The viewer's eye cannot perceive rapid flickering of LEDs 52. Instead, the viewer perceives an average brightness. It is typically desirable to multiplex the operation of LEDs 52. Where LEDs are operated in a multiplexed manner, correcting for motion blur can be performed by synchronizing the multiplexing of LEDs 52 with the refreshing of spatial light modulator 52.

As will be apparent to those skilled in the art in the light of the foregoing disclosure, many alterations and modifications are possible in the practice of this invention without departing from the spirit or scope thereof. For example:

diffuser 22 and collimator 18 could be combined with one another;

diffuser 22 and collimator 18 could be reversed in order;

multiple cooperating elements could be provided to perform light diffusion and/or collimation;

the function of diffuser 22 could be provided by another element which both diffuses light and performs some other function. In such cases, the other element may be said to comprise a diffuser and an apparatus comprising such an element comprises a diffuser;

the order in screen 23 of second light modulator 20 collimator 18 and diffuser 22 could be varied;

the signal 38A driving first light modulator 16 may comprise the same data driving second light modulator 20 or may comprise different data.

Instead of or in addition to providing measuring light output for fixed calibration currents, calibration mechanisms 78 and/or 90 could adjust current to a LED 52 until the LED 52 provides a desired brightness.

Accordingly, the scope of the invention includes, but is not limited to, the substance defined by the following claims.

What is claimed is:

1. A display comprising:
   a light source comprising a two-dimensional array of light-emitting elements each having a controllable light output; and
   a spatial light modulator comprising a plurality of controllable elements located to modulate light from the light source;
   wherein:
   the spatial light modulator has more controllable elements than the light source has light-emitting elements;
   each of the light-emitting elements of the light source is located to illuminate a plurality of corresponding controllable elements of the spatial light modulator; and
   the display comprises a grid of reflective walled channels located intermediate the light source and the spatial light modulator.

2. The display of claim 1 wherein the reflective walled channels are hexagonal and arranged in a honeycomb structure.

3. The display of claim 1 wherein each of the light-emitting elements emits light into one of the reflective-walled channels.

4. The display of claim 1 wherein each of the controllable elements of the spatial light modulator is illuminated by light from only one of the reflective-walled channels.

5. A display according to claim 1 wherein the light-emitting elements comprise light emitting diodes which emit white light.

6. A display comprising:
   a light source comprising a two-dimensional array of light-emitting elements each having a controllable light output; and,
   a spatial light modulator comprising a plurality of controllable elements located to modulate light from the light source;
   wherein:
   the spatial light modulator has more controllable elements than the light source has light-emitting elements;
   each of the light-emitting elements of the light source is located to illuminate a plurality of corresponding controllable elements of the spatial light modulator; and
   at the spatial light modulator, a distribution of light incident from each of a plurality of the light-emitting elements of the light source comprises a convolution of a rectangular distribution and a spread function wherein the spread function has a full width at half maximum in the range of $0.3 \times d_2$ to $3 \times d_2$, where $d_2$ is a center-to-center spacing on the spatial light modulator of distributions of light modulated by adjacent light-emitting elements of the light source.

7. The display of claim 6 wherein each of the light-emitting elements of the light source corresponds to eight or more corresponding controllable elements of the spatial light modulator.

8. The display of claim 4 wherein each light-emitting element of the light source corresponds to 145 or fewer corresponding controllable elements of the spatial light modulator.

9. The display of claim 6 comprising a diffuser located intermediate the light source and the spatial light modulator.

10. The display of claim 6 comprising a diffuser located between the spatial light modulator and a viewing position.

11. The display of claim 6 wherein, a ratio of luminance of a first point, for which a corresponding light-emitting element is at a maximum light output and a corresponding element of the spatial light modulator is set to provide maximum illumination, and a second point, for which the corresponding light-emitting element is at minimum light output and the corresponding element of the spatial light modulator is set to provide minimum illumination, exceeds 1000:1.

12. The display of claim 6 wherein, a ratio of luminance of a first point, for which a corresponding light-emitting element is at a maximum light output and a corresponding element of the spatial light modulator is set to provide maximum illumination, and a second point, for which the corresponding light-emitting element is at minimum light output and the corresponding element of the spatial light modulator is set to provide minimum illumination, exceeds 1500:1.

13. The display of claim 6 wherein each of the light-emitting elements comprises a solid state light emitting element.

14. The display of claim 13 wherein the solid state light emitting elements comprise light emitting diodes.

15. The display of claim 13 wherein a color of light emitted by the solid state light emitting elements is controllable.

16. The display of claim 6 wherein the controllable elements of the spatial light modulator comprise liquid crystal display elements.

17. A display according to claim 6 wherein the light-emitting elements comprise light emitting diodes which emit white light.

18. The display according to claim 6, wherein:
    the light-emitting elements comprise white light emitting Light Emitting Diodes (LEDs); and
    the display further comprises a video control circuit configured to receive an image signal, and, based on the image signal, provide a backlight control signal configured to locally dim portions of the LED array.

19. The display according to claim 18, wherein:
    the spatial light modulator comprises an LCD panel; and
    the video control circuit further configured to, based on the image signal, provide an LCD control signal configured to adjust the LCD panel to modulate the locally dimmed light from the LED array so that a resulting image viewed on the LCD panel approaches a desired image carried by the image signal.

20. The display according to claim 6, wherein:
    the spatial light modulator comprises an LCD panel; and
    the display further comprises a video control circuit configured to receive an image signal, and, based on the image signal, provide an LCD control signal configured to adjust the LCD panel to modulate light from the light emitting elements so that a resulting image viewed on the LCD panel approaches a desired image carried by the image signal.

21. The display according to claim 6, wherein:
    the spatial light modulator comprises an LCD panel, and the light source comprises a two-dimensional array of Light Emitting Diode (LED) based white light-emitting sources; and
    the display further comprises a video control circuit configured to receive an image signal, and, based on the image signal, provide a backlight control signal configured to locally dim portions of the LED based white light-emitting sources when applied to the LED based white light-emitting sources, and an LCD control signal configured to set a transmissivity in each pixel of the LCD panel when applied to the LCD panel, said transmissivity of each pixel of the LCD panel being an amount to modulate each pixel at the LCD panel being such that a low resolution image provided by the LED based white light-emitting sources is transformed by modulation according to the LCD panel so that an image viewed on the LCD panel approaches a desired image.

22. The display according to claim 21, wherein pixels of the light source are common to a plurality of pixels of the spatial light modulator, and the LCD control signal is configured to control the higher-resolution spatial light modulator to reduce artefacts which result from the fact that each pixel of the lower-resolution light source is common to a plurality of pixels of the higher-resolution spatial light modulator.

23. The display according to claim 21, wherein pixels of the light source are of a lower resolution than pixels of the spatial light modulator, and the LCD control signal is configured to control the higher-resolution spatial light modulator to reduce artefacts which result from the fact that the spatial light modulator has more controllable elements than the light source has light-emitting elements.

24. The display according to claim 21, wherein the backlight control signal is configured to adjust intensity of the light emitting elements over a predetermined intensity range in a predetermined number of steps and the LCD control signal is configured to adjust intensity of the controllable elements of the spatial light modulator over a similar intensity range in a number of steps greater than the predetermined number of steps.

25. The display according to claim 6, wherein the light emitting elements adjust light intensity in coarser steps than the controllable elements of the spatial light modulator.

26. The display according to claim 6, wherein the light emitting elements are configured to be adjusted over an intensity range in a predetermined number of steps and the controllable elements of the spatial light modulator are configured to be adjusted over a similar range of intensity in a number of steps greater than the predetermined number of steps.

27. The display according to claim 26, wherein the controllable elements of the spatial light modulator are configured to be adjusted over the intensity range in 512 steps.

28. The display according to claim 6, wherein the illumination of the controllable light elements on the spatial light modulator comprises an approximation of a desired image.

29. A display comprising:
a light source comprising a two-dimensional array of light-emitting elements each having a controllable light output; and,
a spatial light modulator comprising a plurality of controllable elements located to modulate light from the light source;
wherein:
the spatial light modulator has more controllable elements than the light source has light-emitting elements;
each of the light-emitting elements of the light source is located to illuminate a plurality of corresponding controllable elements of the spatial light modulator; and,
the light-emitting elements of the light source each have a number N of discrete selectable brightness levels, and the controllable elements of the spatial light modulator have a number M of discrete selectable brightness levels and N>M.

30. A display according to claim 29 wherein the light-emitting elements comprise light emitting diodes which emit white light.

31. A display comprising:
a light source comprising a two-dimensional array of light-emitting elements each having a controllable light output;
a spatial light modulator comprising a plurality of controllable elements located to modulate light from the light source;
wherein:
the spatial light modulator has more controllable elements than the light source has light-emitting elements;
each of the light-emitting elements of the light source is located to illuminate a plurality of corresponding controllable elements of the spatial light modulator;
each of the light-emitting elements comprises a solid state light emitting element;
the solid state light emitting elements comprise light emitting diodes; and,
the light emitting diodes emit white light.

32. The display of claim 31 wherein the spatial light modulator comprises a color spatial light modulator.

33. The display of claim 32 wherein each controllable element of the spatial light modulator comprises a plurality of color sub pixels.

34. The display of claim 31 comprising a controller connected to deliver image data to both the light source and the spatial light modulator.

35. The display of claim 34 wherein the controller is configured to periodically refresh the controllable elements and to dim or turn off the corresponding light emitting element while a controllable element is being refreshed.

36. The display of claim 34 comprising a light detector coupled to receive stray light from at least one of the light-emitting elements and to generate a stray light intensity signal indicative of an intensity of the stray light wherein the controller is configured to: receive the stray light intensity signal; determine a current correction for the at least one of the light-emitting elements based at least in part on the intensity of the stray light from the at least one of the light-emitting elements and a reference value; and, use the current correction in controlling the at least one of the light-emitting elements.

37. A display according to claim 36 wherein the light detector is coupled to receive the stray light by a planar waveguide.

38. A display according to claim 37 wherein the light-emitting elements are received in apertures of the planar waveguide and the waveguide captures light emitted by the light-emitting elements in a sideways direction.

39. A display according to claim 38 wherein the planar waveguide is located behind the light-emitting elements.

40. The display of claim 34 wherein upon determining that a defective one of the light-emitting elements is not operating, the controller is configured to increase intensities of other light-emitting elements adjacent to the defective one of the light-emitting elements.

41. The display of claim 34 wherein upon determining that a defective one of the light-emitting elements is not operating, the controller is configured to increase a transmissivity of those of the controllable elements which correspond to the defective light-emitting element.

42. A display according to claim 34 comprising a planar waveguide located in front of the light-emitting elements and a light sensor coupled to the planar waveguide to detect light emitted by the light-emitting elements.

43. A display according to claim 42 wherein one surface of the planar waveguide is roughened sufficiently to direct a fraction of light emitted by the light-emitting elements into the planar waveguide.

44. The display of claim 31 wherein the light-emitting elements are arranged in a regular array.

45. A display according to claim 31 comprising a control circuit for individually varying the controllable light outputs of the light-emitting elements by varying duty cycles of the light-emitting elements.

46. A display according to claim 31 comprising a control circuit for individually varying the controllable light outputs of the light-emitting elements by varying electrical driving currents delivered to the light-emitting elements.

47. A display comprising:
a light source comprising a two-dimensional array of light-emitting elements each having a controllable light output;
a spatial light modulator comprising a plurality of controllable elements located to modulate light from the light source;
wherein:
the spatial light modulator has more controllable elements than the light source has light-emitting elements;
each of the light-emitting elements of the light source is located to illuminate a plurality of corresponding controllable elements of the spatial light modulator;
the light-emitting elements are arranged in a regular array; and,
the display comprises light barriers disposed between adjacent ones of the light-emitting elements.

48. The display of claim 47 wherein the array is a rectangular array.

49. The display of claim 47 wherein the array is a hexagonal array.

50. A display according to claim 47 wherein the light-emitting elements comprise light emitting diodes which emit white light.

51. A display comprising:
a light source comprising a two-dimensional array of light-emitting elements each having a controllable light output; and
a spatial light modulator comprising a plurality of controllable elements located to modulate light from the light source;
wherein:
the spatial light modulator has more controllable elements that the light source has light-emitting elements;
each of the light-emitting elements of the light source is located to illuminate a plurality of corresponding controllable elements of the spatial light modulator;
at the spatial light modulator , a distribution of light incident from each of a plurality of the light emitting elements of the light source comprises a convolution of a rectangular distribution and a spread function wherein the spread function has a full width at half maximum in the range of $0.3 \times d_2$ to $3 \times d_2$, where $d_2$ is a center-to-center spacing on the spatial light modulator of distributions of light modulated by adjacent light-emitting elements of the light-source;
the light source comprises a two-dimensional array of Light Emitting Diode (LED) based white light-emitting sources;
the display further comprising a video control circuit configured to receive an image signal, and, based on the image signal, provide a backlight control signal configured to locally dim portions of the LED array;
the spatial light modulator comprises an LCD panel;
the video control circuit further configured to, based on the image signal, provide an LCD control signal configured to adjust the LCD panel to modulate the locally dimmed light from the LED array so that a resulting image viewed on the LCD panel approaches a desired image carried by the image signal;
the backlight control signal further configured to adjust light intensity of the light-emitting elements in coarser steps than the LCD control signal is configured to adjust light intensity of the controllable elements of the spatial light modulator;
the backlight control signal configured to adjust intensity of the light emitting elements in a predetermined number of steps and the LCD control signal configured to adjust intensity of the controllable elements of the spatial light modulator in a number of steps greater than the predetermined number of steps; and
the illumination of the controllable light elements on the spatial light modulator comprises an approximation of a desired image.

52. The display according to claim 51, wherein the predetermined number of steps of the backlight control signal control intensity over a similar range of intensity as the greater number of steps configured in the LCD control signal.

53. The display according to claim 51, wherein the LCD control signal is configured to control the controllable elements of the spatial light modulator in 512 steps of intensity.

54. The display according to claim 51, wherein each pixel of the light source is common to a plurality of pixels of the spatial light modulator, and the LCD control signal is configured to control the spatial light modulator to reduce artifacts which result from the fact that each pixel of the light source is common to a plurality of pixels of the spatial light modulator.

55. The display according to claim 51, wherein the light control signals are based on an averaging function of the desired image.

56. The display according to claim 55, wherein the averaging function is a weighted average.

57. The display according to claim 51, wherein the distribution is based on a rectangular profile having a width $d_1$ equal to an active width of the pixel and $d_1$ is approximately equal to $d_2$.

58. The display according to claim 51, wherein the display comprises a locally-dimmed flat-panel LCD high dynamic range display having a dynamic range of 800:1 or greater.

* * * * *

UNITED STATES PATENT AND TRADEMARK OFFICE
CERTIFICATE OF CORRECTION

PATENT NO.        : 7,403,332 B2
APPLICATION NO.   : 10/507460
DATED             : July 22, 2008
INVENTOR(S)       : Lorne A. Whitehead et al.

It is certified that error appears in the above-identified patent and that said Letters Patent is hereby corrected as shown below:

At col. 1, ln. 2, after the title, the following text is added:

-- The claimed invention was made as a result of activities undertaken within the scope of a joint research agreement as defined under 35 U.S.C. 103(c) between the National Sciences and Engineering Research Council of Canada, Lorne Whitehead of the University of British Columbia, Wolfgang Stuerzlinger and Hugh Wilson of York University, and Avi Chaudhuri of McGill University. --

Signed and Sealed this

Twenty-ninth Day of September, 2009

David J. Kappos
*Director of the United States Patent and Trademark Office*